US011649108B2

(12) United States Patent
de Graaff et al.

(10) Patent No.: US 11,649,108 B2
(45) Date of Patent: *May 16, 2023

(54) PAD WITH A RELATIVELY LARGE OUTLET OPENING COMPRISING A SOLUBLE BEVERAGE PREPARATION PRODUCT FOR USE IN A COFFEE MACHINE

(71) Applicant: Koninklijke Douwe Egberts B.V., Utrecht (NL)

(72) Inventors: Gerbrand Kristiaan de Graaff, Hillegom (NL); Gustaaf Frans Brouwer, Nijkerk (NL); Christiaan Johannes Maria Moorman, Moergestel (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 248 days.

This patent is subject to a terminal disclaimer.

(21) Appl. No.: 17/157,332

(22) Filed: Jan. 25, 2021

(65) Prior Publication Data

US 2021/0221603 A1 Jul. 22, 2021

Related U.S. Application Data

(63) Continuation of application No. 14/874,204, filed on Oct. 2, 2015, now Pat. No. 10,934,085, which is a
(Continued)

(30) Foreign Application Priority Data

Apr. 3, 2013 (NL) .................................... 2010562

(51) Int. Cl.
*A47J 31/40* (2006.01)
*B65D 85/804* (2006.01)
*A47J 31/06* (2006.01)

(52) U.S. Cl.
CPC ...... *B65D 85/8052* (2020.05); *A47J 31/0668* (2013.01); *A47J 31/0678* (2013.01);
(Continued)

(58) Field of Classification Search
CPC ............ B65D 85/8052; B65D 85/8064; B65D 85/8055; B65D 85/8046; A47J 31/0668; A47J 31/0678
(Continued)

(56) References Cited

U.S. PATENT DOCUMENTS

| | | | |
|---|---|---|---|
| 5,150,645 A | 9/1992 | Schiettecatte | |
| 5,242,702 A | 9/1993 | Fond | |

(Continued)

FOREIGN PATENT DOCUMENTS

| | | |
|---|---|---|
| AU | 2009206182 A1 | 2/2011 |
| CN | 1444894 A | 10/2003 |

(Continued)

OTHER PUBLICATIONS

International Preliminary Report on Patentability for PCT Appl. Ser. No. PCT/NL2014/050205 dated Oct. 6, 2015, (13 pages).
(Continued)

*Primary Examiner* — Jimmy Chou
(74) *Attorney, Agent, or Firm* — Foley & Lardner LLP

(57) ABSTRACT

Pad including a covering filled with a soluble beverage preparation product. The covering comprises a flexible first sheet and a rigid shell which are connected to each other. The shell has at least one outlet opening. The pad is further equipped with a flexible second sheet that is positioned on a bottom of the shell located between the product and the shell. The first sheet and the second sheet each form a filter that allows an aqueous fluid, including water, and the beverage to pass and that forms a barrier for the product. The at least one outlet opening preferably has a diameter of a
(Continued)

sufficient size for passing beverage substantially unrestricted.

20 Claims, 20 Drawing Sheets

Related U.S. Application Data continuation of application No. PCT/NL2014/050209, filed on Apr. 3, 2014.

(52) U.S. Cl.
CPC ..... *B65D 85/8046* (2013.01); *B65D 85/8055* (2020.05); *B65D 85/8064* (2020.05)

(58) Field of Classification Search
USPC .......................................................... 99/295
See application file for complete search history.

(56) References Cited

U.S. PATENT DOCUMENTS

| | | | |
|---|---|---|---|
| 5,472,719 A | 12/1995 | Favre | |
| 5,870,943 A | 2/1999 | Levi et al. | |
| 6,035,762 A * | 3/2000 | Ruckstuhl | A47J 31/3623 |
| | | | 99/302 R |
| 7,503,254 B2 | 3/2009 | Noordhuis | |
| 7,543,527 B2 | 6/2009 | Schmed | |
| 7,836,818 B2 * | 11/2010 | Noordhuis | A47J 31/0678 |
| | | | 99/302 R |
| 8,881,643 B2 * | 11/2014 | Baldo | A47J 31/60 |
| | | | 99/290 |
| 2002/0022070 A1 | 2/2002 | Dijs | |
| 2003/0096038 A1* | 5/2003 | Cai | A47J 31/14 |
| | | | 426/77 |
| 2003/0172813 A1 | 9/2003 | Schifferle | |
| 2004/0005384 A1 | 1/2004 | Cai | |
| 2004/0191372 A1 | 9/2004 | Halliday et al. | |
| 2005/0155494 A1* | 7/2005 | Brouwer | A47J 31/40 |
| | | | 99/279 |
| 2005/0158426 A1* | 7/2005 | Hu | B65D 85/8043 |
| | | | 426/77 |
| 2006/0075903 A1 | 4/2006 | Dijs | |
| 2006/0230942 A1 | 10/2006 | Noordhuis | |
| 2007/0084352 A1* | 4/2007 | Yuen | A47J 31/3685 |
| | | | 99/295 |
| 2008/0115675 A1 | 5/2008 | Suggi Liverani et al. | |
| 2008/0245236 A1* | 10/2008 | Ternite | A47J 31/3623 |
| | | | 99/295 |
| 2009/0007793 A1* | 1/2009 | Glucksman | B65D 85/8061 |
| | | | 99/302 R |
| 2009/0022855 A1 | 1/2009 | Steenhof et al. | |
| 2009/0126577 A1* | 5/2009 | Ternite | A47J 31/0673 |
| | | | 99/295 |
| 2009/0178571 A1 | 7/2009 | Brouwer et al. | |
| 2010/0173055 A1 | 7/2010 | Brouwer | B65D 85/8046 |
| | | | 426/77 |
| 2010/0196545 A1 | 8/2010 | Buffet et al. | |
| 2010/0239733 A1* | 9/2010 | Yoakim | B65D 85/8061 |
| | | | 99/302 R |
| 2010/0288131 A1* | 11/2010 | Kilber | B65D 85/8061 |
| | | | 99/290 |
| 2011/0027425 A1 | 2/2011 | Heijdel et al. | |
| 2011/0185910 A1* | 8/2011 | Ryser | A47J 31/369 |
| | | | 426/77 |
| 2011/0274802 A1* | 11/2011 | Rivera | B65D 85/8061 |
| | | | 426/431 |
| 2012/0251670 A1* | 10/2012 | Kamerbeek | A47J 31/407 |
| | | | 426/77 |
| 2012/0251671 A1* | 10/2012 | Kamerbeek | B65D 85/8061 |
| | | | 426/77 |
| 2012/0328739 A1 | 12/2012 | Nocera | |
| 2013/0071532 A1 | 3/2013 | Pribus et al. | |
| 2013/0118360 A1 | 5/2013 | Dogan et al. | |
| 2013/0139699 A1* | 6/2013 | Rivera | B65D 85/8061 |
| | | | 99/295 |
| 2013/0243911 A1 | 9/2013 | Abegglen et al. | |
| 2014/0220205 A1* | 8/2014 | Kamerbeek | A47J 31/368 |
| | | | 426/431 |
| 2015/0034127 A1* | 2/2015 | Talon | A47J 31/3695 |
| | | | 99/295 |
| 2015/0135968 A1* | 5/2015 | Gort-Barten | A47J 31/0684 |
| | | | 99/295 |
| 2015/0208852 A1* | 7/2015 | Doglioni Majer | B65D 85/8064 |
| | | | 426/115 |
| 2016/0068336 A1* | 3/2016 | Biesheuvel | B65D 85/8061 |
| | | | 426/115 |
| 2016/0137402 A1* | 5/2016 | Talon | B65D 85/8055 |
| | | | 426/115 |
| 2016/0214788 A1 | 7/2016 | Kamerbeek et al. | |
| 2016/0257487 A1 | 9/2016 | De Graaff et al. | |
| 2016/0264347 A1* | 9/2016 | de Graaff | B65D 85/8061 |

FOREIGN PATENT DOCUMENTS

| | | |
|---|---|---|
| CN | 101389551 A | 3/2009 |
| CN | 103002781 A | 3/2013 |
| CN | 102481063 B | 6/2015 |
| EP | 0 224 297 A1 | 6/1987 |
| EP | 0 904 717 A1 | 3/1999 |
| EP | 1 398 279 A2 | 3/2004 |
| EP | 1 893 507 B1 | 3/2008 |
| EP | 2 236 437 A1 | 10/2010 |
| EP | 2 239 212 A1 | 10/2010 |
| EP | 2 743 206 A1 | 6/2014 |
| EP | 2 891 614 | 7/2015 |
| ES | 2234445 | 2/2005 |
| ES | 2398277 A1 | 3/2013 |
| FR | 2127329 A5 | 10/1972 |
| WO | WO-01/15582 A1 | 3/2001 |
| WO | WO-2004/083071 A1 | 9/2004 |
| WO | WO-2006/043103 A1 | 4/2006 |
| WO | WO-2010/106516 A1 | 9/2010 |
| WO | WO-2011/039027 A1 | 4/2011 |
| WO | WO-2012/019902 A1 | 2/2012 |
| WO | WO-2013/021080 A1 | 2/2013 |
| WO | WO-2014/158656 A1 | 10/2014 |
| WO | WO-2014/163497 A1 | 10/2014 |
| WO | WO-2014/163498 A1 | 10/2014 |

OTHER PUBLICATIONS

International Preliminary Report on Patentability for PCT Appl. Ser. No. PCT/NL2014/050207 dated Oct. 6, 2015, (7 pages).
International Preliminary Report on Patentability for PCT Appl. Ser. No. PCT/NL2014/050209 dated Oct. 6, 2015 (12 pages).
International Preliminary Report on Patentability for PCT Appl. Ser. No. PCT/NL2014/05206 dated Oct. 6, 2015, (12 pages).
International Preliminary Report on Patentability for PCT Appl. Ser. No. PCT/NL2014/05208 dated Oct. 6, 2015 (12 pages).
International Search Report and Written Opinion in PCT Appl. Ser. No. PCT/NL2014/050208 dated Sep. 29, 2014 (19 pages).
International Search Report and Written Opinion on PCT Appl. Ser. No. PCT/NL2014/050205 dated Sep. 26, 2014 (22 pages).
International Search Report and Written Opinion on PCT Appl. Ser. No. PCT/NL2014/050206 dated Sep. 29, 2014 (19 pages).
International Search Report and Written Opinion on PCT Appl. Ser. No. PCT/NL2014/050207 dated Jun. 16, 2014 (10 pages).
International Search Report and Written Opinion on PCT Appl. Ser. No. PCT/NL2014/050209 dated Sep. 29, 2014 (19 pages).
US Ex Parte Quayle Action on U.S. Appl. No. 14/874,204 dated Aug. 5, 2020 (7 pages).

* cited by examiner

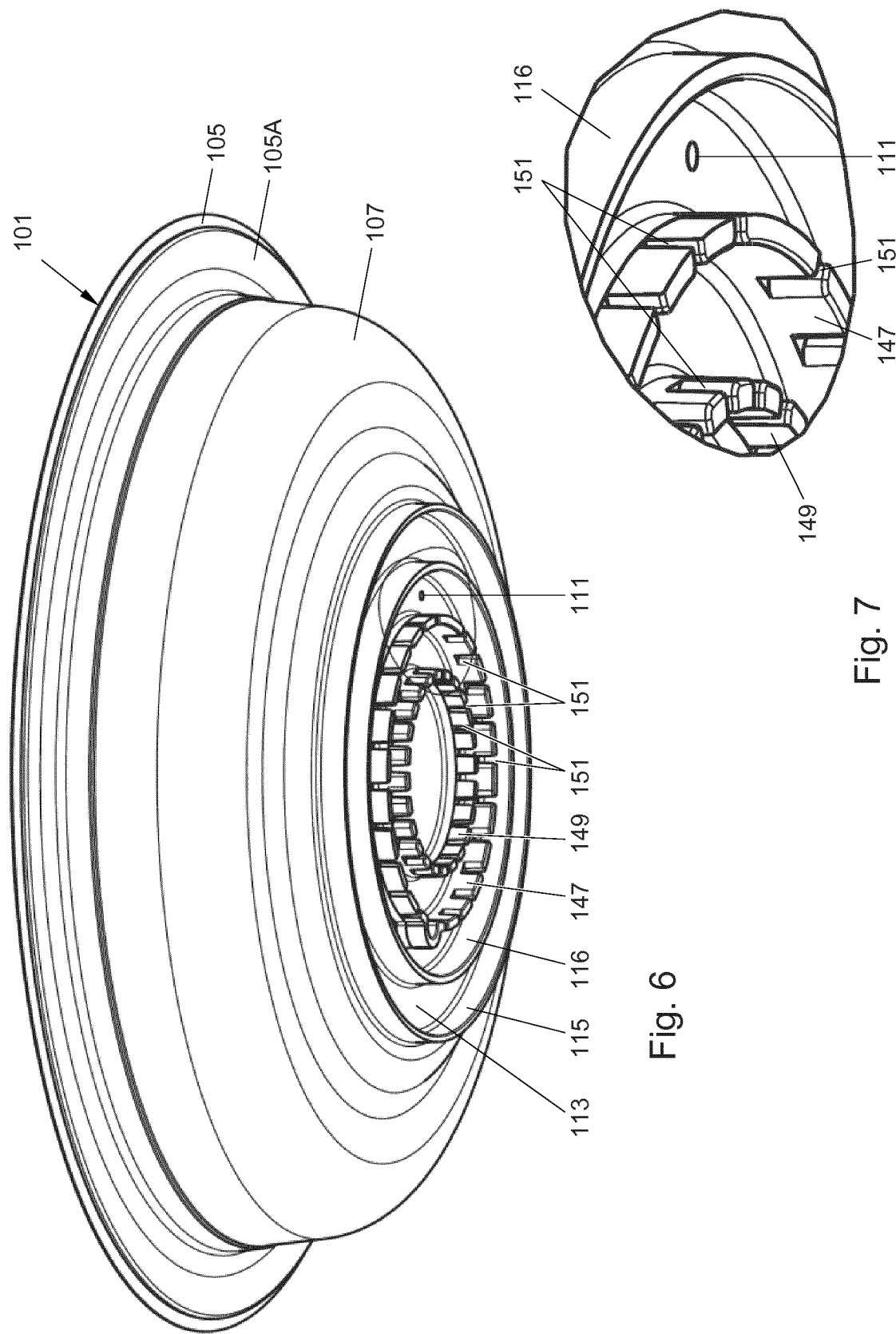

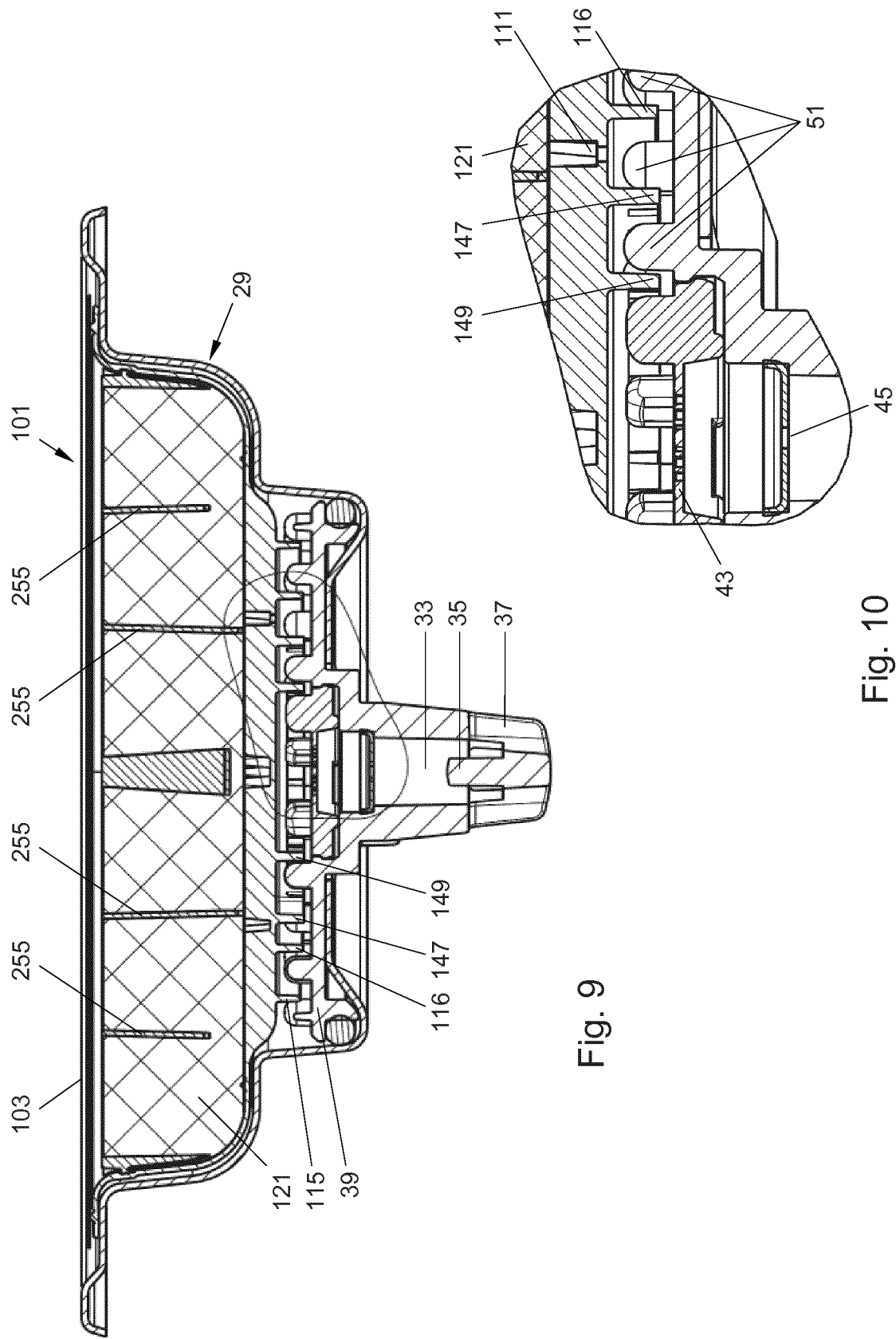

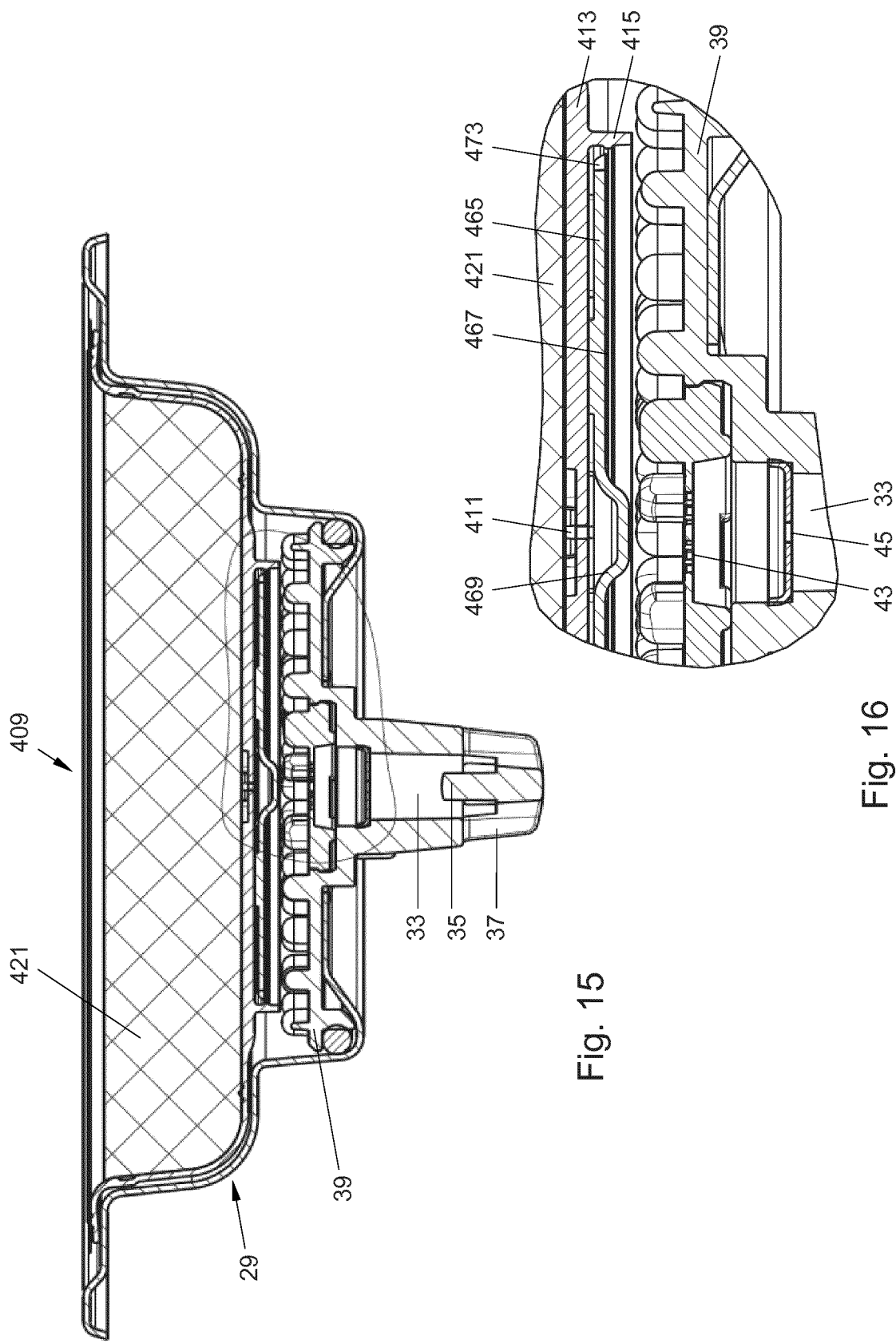

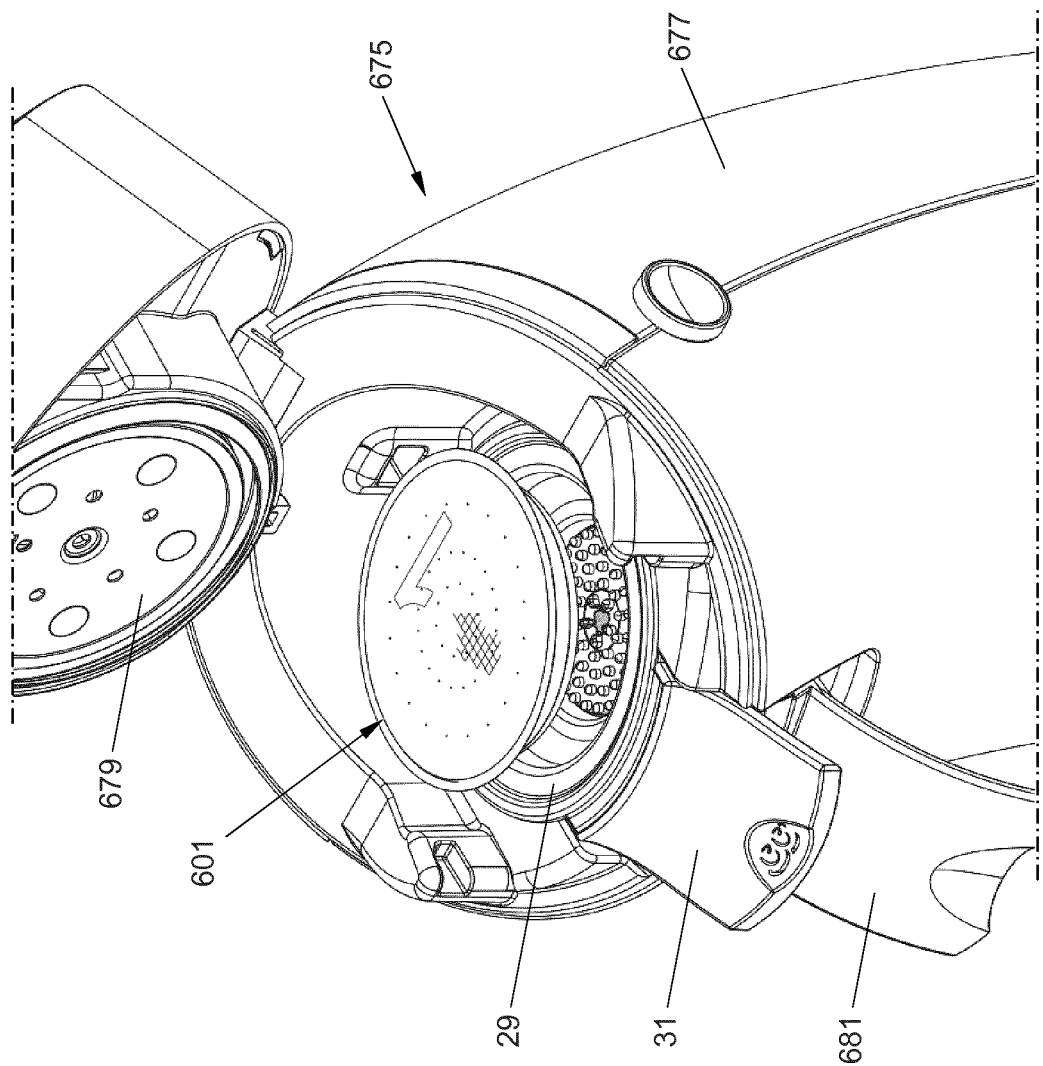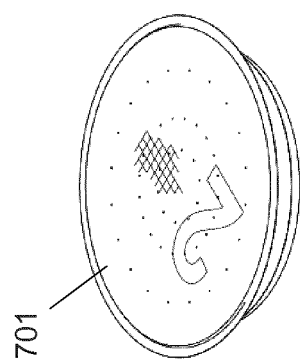
Fig. 20

PAD WITH A RELATIVELY LARGE OUTLET OPENING COMPRISING A SOLUBLE BEVERAGE PREPARATION PRODUCT FOR USE IN A COFFEE MACHINE

CROSS-REFERENCE TO RELATED PATENT APPLICATIONS

This Application is a continuation of U.S. application Ser. No. 14/874,204, filed on Oct. 2, 2015, which is a continuation of International Patent Application No. PCT/NL2014/050209, filed Apr. 3, 2014, which claims the benefit of priority to Netherlands Application No. NL2010562, filed Apr. 3, 2013, all of which are hereby incorporated herein by reference in their entireties.

BACKGROUND AND SUMMARY

The invention relates to a pad for use in a coffee machine for preparing at least one part of a single beverage serving. In use, with the coffee machine, an aqueous fluid such as water is supplied under pressure to the pad so that the fluid is forced through the pad for obtaining a beverage that then exits the pad. The pad includes a covering defining an interior space that is filled with a beverage preparation product for preparing the beverage, wherein the covering comprises a flexible first sheet.

The invention also relates to a system equipped with a coffee machine and such a pad.

In addition, the invention relates to the use of such a pad and a method for preparing a beverage with such a pad.

Finally, the invention relates to a kit of parts including such a pad.

One such pad, coffee machine and method of operation are generally known from European patent publication EP 0904717. The known pads are usually formed as relatively soft pillow-shaped pouches that are not by themselves form retaining when subjected to mechanic or hydraulic forces. As such the known pads are formed from two sheets of filtering material, such as porous paper that are connected to each other at their perimeter edges about a filling of an extractable or soluble beverage ingredient. It has further been known from EP-A-1 398 279 and US 2011/0027425 to provide a pad for use in a coffee machine for preparing beverages by dissolving. In this alternative form of pad the soluble filling is also contained between first and second permeable layers. In addition the pad is provided with a rigid grid structure between the first and second permeable layers, to prevent agglomeration of the soluble product and prevent collapsing of the pad during use. The known forms of pad have been fairly successful when using relatively low pressures for the fluid, such as hot water, that is fed to the pad to obtain the beverage part. Nonetheless it has been important and hence an ongoing concern that when placing the known pad in a compartment of a coffee machine that any soft parts, such as the interconnected perimeter edges, of the pad are manually adapted to the shape of the compartment to ensure an adequate fluid seal. Filtering paper when wetted usually provides a good fluid seal against the flat surfaces found in the pad compartments of such coffee machines. It can however occur that the edges of the known pad are slightly crumbled or folded, which may require a careful flattening by the user when the pad is inserted in the coffee machine. Because of the deformability of these relatively soft pads, it can also happen that the filling loses its homogeneity throughout the pad. These effects, when not noticed and corrected by the user, can lead to the hot liquid bypassing around the pad or by channelling through the bed of beverage preparation product. This has a very adverse effect on the quality of the beverage obtained and results in unnecessary losses. Another aspect of the known pads is that the fluid seal obtainable does not allow a high pressure drop across the pad.

Accordingly it is an object of the present invention to propose an improved pad, system and method for preparing beverages. In a more general sense it is also an object of the invention to overcome or ameliorate at least one disadvantage of the prior art. It is also an object of the present invention to provide alternative structures which are less cumbersome in assembly and operation and which moreover can be made relatively inexpensively. Alternatively it is an object of the invention to at least provide the public with a useful alternative. There has also been a desire to be able to prepare different coffee varieties with the standard Senseo® machine. Such desirable varieties include cappuccinos, latte macchiato, and Wiener melange, which are best prepared in a two-step process, to provide a beverage with visual separate layers.

To this end the invention provides for a pad, a system, a kit of parts, a use, and methods as defined in one or more of the appended claims.

Notably a pad for use in a coffee machine for preparing at least one part of a single beverage serving which pad, for use in the coffee machine, is adapted to receive an aqueous fluid that is supplied under pressure so that the aqueous fluid is forced through the pad for obtaining the at least on part of the beverage serving that then exits the pad. The pad includes a covering defining an interior space that is filled with a beverage preparation product for preparing the beverage wherein the beverage preparation product includes a product soluble in an aqueous fluid. The covering comprises a flexible first sheet and a rigid shell, wherein the first sheet and the shell are connected to each other around their perimeter edges, and wherein the shell is equipped with at least one outlet opening. The pad is further equipped with a second sheet that is positioned on a bottom of the shell, wherein the second sheet is located between the beverage preparation product and the shell and wherein the first sheet and the second sheet each form a filter that allows an aqueous fluid, including water, and the beverage to pass and that forms a barrier for the beverage preparation product. When in use an aqueous fluid under pressure is supplied to the first sheet of the pad the aqueous fluid flows through the first sheet to the beverage preparation product so that the beverage is formed. The beverage then flows through the second sheet and via the at least one outlet opening leaves the pad. The at least one outlet opening preferably has a diameter of a sufficient size for passing the beverage substantially unrestricted. In this regard, substantially unrestricted preferably means that the flow of the beverage through the outlet opening is not significantly restricted, that the volume of beverage passing through the opening is not significantly reduced by the size of the opening or that a possible restriction formed by the outlet opening is less than the restriction formed by the beverage preparation product itself. In particular, the outlet opening has a size which does not substantially reduce the volume of the beverage, when used in a coffee machine with a time controlled supply of aqueous fluid. The beverage preparation product soluble in an aqueous fluid can be any soluble substance that comprises one or more from the group consisting of instant coffee, instant tea, a chocolate ingredient, instant milk powder/creamer, chicory, spices, optionally in combination with roast and ground coffee, tea, sugar or flavors. It is in particular advantageous when the soluble substance is instant coffee, instant milk powder/creamer, or a chocolate ingredient.

Such a pad, when used in a coffee machine with a time controlled hot water supply, such as the typical Senseo® coffee machine, results in a normal volume of beverage with a high dry matter content and an reproducible intensity or strength, and giving a more stable taste when the soluble product is an instant coffee powder, or chocolate since bypassing is at least substantially prevented. With such a suitably adapted pad it is now also possible to prepare a single serving of beverage in a two-step process, such as dairy or dairy replacement containing beverages like cappuccinos, latte macchiato, Wiener melange, or like beverages. In such a two-step process at least one of the pads will be a pad according to the invention containing a milk powder/creamer. A second pad will then contain a coffee product. Thus the pad according to the invention allows a high pressure drop across the pad to occur and to be maintained despite of the relatively large outlet opening without bypass of the beverage preparation product.

Advantageously the at least one outlet opening in all the embodiments of the invention has a smallest diameter larger than the largest diameter of any nozzle of the outlet of the pad holder or the at least one outlet opening of the pad forms a flow restriction which is substantially less than the flow restriction formed by the exit opening of the holder. More preferably the outlet opening has a diameter more than or equal to 0.83 mm, and preferably this diameter is within a range from 0.88 to 0.94 mm. It should be clear in this regard, that the opening and nozzle need neither be circular nor have a uniform diameter. Preferably the through-flow opening of the outlet opening has an opening area of more than or equal to 0.54 mm$^2$, preferably through-flow opening area from 0.61 to 0.69 mm$^2$.

In one pad according to the invention, an interior space of the shell is bowl-shaped, and the pad is asymmetrical with respect to the connected perimeter edges of the first sheet and the shell. This enables a perimeter edge of the pad to be securely brought into sealing engagement with a complementary formed flange of a pad holder.

In another pad according to the invention, a fluid collecting structure is provided in the interior space of the pad in the bottom of the shell which is in fluid connection with the at least one outlet opening. The fluid collecting structure in the bottom of the shell is provided with channels, which channels are in fluid communication with the at least one outlet opening, while the second sheet, which is positioned on the bottom of the shell, covers the channels, so that a formed beverage that flows through the second sheet reaches the at least one outlet opening via the channels. In such a pad according to the invention, the channels can advantageously be integrally formed in the bottom of the shell. Such structures not only ensure that the beverage can be collected from the entire lower surface area of the beverage preparation product, but also provide at the same time a support surface for the second sheet.

Although a plurality of outlet openings may be present, it is preferred that the pad comprises one outlet opening. It is more preferred that this one outlet opening is positioned centrically in the bottom of the rigid shell.

It can be of further advantage when the first sheet is substantially impermeable to liquid, and is provided with a plurality op of inlet openings distributed in a pattern, advantageously distributed evenly in a pattern. This plurality of inlet openings, in use, will cause jets of hot water to enter the pad at spaced locations to assist in dissolving the beverage preparation product. Preferably, the jets of hot water also cause swirls to further promote dissolving of the soluble beverage preparation product. It has been determined that inlet opening sizes of 150 to 350 µm, preferably 200 to 300 µm, more preferably about 225 µm and a total number of inlet openings in a range of 35 to 45, give the best yield without a possible blockage of individual of openings, or flow resistance in general, becoming a worry.

The first sheet may advantageously include at least one of a PP and a PET material, and alternatively may also be a laminate. A risk exists that during use the first sheet may contact the soluble beverage preparation product and cause objectionable agglomeration. It may therefore be advantageous when the first sheet is at least one of tensioned and stretched when attached to the shell. This may be either prior to or after its attachment to the shell. Tensioning or stretching after attachment may be achieved by allowing the first sheet to shrink. A taut first sheet, resulting in a straight and even underside, helps in preventing sagging of the first sheet, contacting the soluble beverage preparation product, and agglomeration of the soluble beverage preparation product, in particular a creamer. Alternatively, the first sheet has a hydrophobic surface on its underside. The first sheet and soluble beverage preparation product may then be in contact without causing agglomeration of the soluble beverage preparation product.

To counteract sagging of the first sheet during use, it is also possible to position a rigid grid structure defining a plurality of grid cells in the interior space of the rigid shell, which then shares the interior space with the soluble beverage preparation product. The rigid grid structure may advantageously include a plurality of intersecting concentric separating walls and radially extending separating walls. As an alternative also the rigid shell may have on an interior perimeter wall a plurality of support walls extending inwardly of the interior perimeter wall for supporting the first sheet.

In a pad according to the invention, the second sheet may include filtering paper or other non-woven material, such as one that is biodegradable, comprising e.g. a PLA non-woven material. The second sheet thus can be flexible.

The shell of the pad according to the invention is advantageously constructed of a polymeric material, such as a plastic, more particularly of PP, a biodegradable plastic, or cardboard. Thereby the shell preferably is substantially impermeable to aqueous fluids.

Further it may be noticed that the pad in combination with a pad holder of a coffee machine according to the invention, may further include means for establishing a laminar flow of beverage so that the pad can cooperate with a holder that has a foam creating nozzle and jet impact surface to create a foamy head on a beverage. Generally these means for establishing a laminar flow may require that length is added to a flow path for the beverage between the outlet opening of the pad and the foam creating nozzle of the holder, in particular an extended flow path for the beverage downstream beyond the at least one outlet opening of the pad. More in particular it will then be advantageous, when the means for establishing a laminar flow includes at least one of a deflector and a labyrinth for converting the jet exiting from the at least one outlet opening into a laminar flow. Such structures not only allow the flow path for the beverage to have an extended length, but also allow a cross sectional area of the flow path to increase downstream of the at least one outlet opening. Furthermore the initial flow of beverage thereby may also be distributed evenly. In this regard the pad and holder may have the deflector positioned downstream of the at least one outlet opening of the pad between the pad and the holder. Then the deflector may either be a deflector plate, or a deflector foil.

Alternatively the means for establishing a laminar flow of beverage may also be a maze, which may advantageously be formed by at least one slotted circular rib adapted to extend in a recess formed between nipples protruding from a bottom of the holder, when the pad is inserted in the holder.

The invention also relates to a system including a coffee machine equipped with a holder for accommodating such a pad and including such a pad. The invention further relates to a use of such a pad by placing it in a holder and to a method for preparing at least one part of a beverage serving with such a pad. The invention still further relates to a kit of parts including at least one such pad and at least one further pad.

Please note that a pad according to the invention is in particular suitable for use in Spain and Brazil where coffee machines such as the Senseo® machines have been adapted to the taste of the specific consumers in those countries to produce a cup volume of about 50 ml, whereas the coffee machines in other countries, such as for the French market, is adapted to produce a cup volume of about 100 ml, and for the rest of European market to produce a cup volume of about 120 ml. For example, the Spanish Senseo® coffee machine can be identified by the Marcilla logo on the lever.

The system according to the invention, may advantageously have the shell at its exterior form a fluid seal with the holder so that a flow of the fluid from a top side of the pad around the pad to the at least one beverage exit opening of the pad holder is prevented. The seal formed between the pad and the holder is advantageously at least one of a static and a dynamic seal. A static seal can be formed initially between an outwardly directed perimeter flange of the pad and a confronting outer edge of the holder. It has been determined that a sufficient static sealing may be obtained solely by gravity, but also light clamping is conceivable. With a dynamic seal the fluid pressure is used to improve contact between the shell and the holder. The rigid shell also ensures that at least a static fluid seal can be obtained between the pad and a holder to allow the increased pressure drop resulting from a restriction in the pad to build up. Generally an initial static sealing is required to enable an increased pressure drop to be created, while a dynamic sealing is advantageously employed to sustain the increased pressure drop. With dynamic sealing the pressure drop itself is providing the sealing force, in that the more pressure drop there is across the shell during brewing, the higher the seal pressure between the pad and the pad holder.

The invention further relates to a kit of parts that includes at least one pad as discussed above, which contains at least one soluble beverage preparation product, and at least one further pad containing one of a substance to dissolve or a substance to extract. The kit of parts according to the invention, can further include a package containing at least one pad as discussed above and the at least one further pad. More advantageous each package will contain a first plurality of pads as discussed above, and a second plurality of further pads. Preferably the pad as discussed above, and the further pad are each appropriately marked as a primary pad or a secondary pad for a two-step beverage preparation process. In a particularly preferred kit of parts according to the invention, the pad as discussed above is the primary pad and the further pad, which may be different, is the secondary pad. Generally the further pad is a pad that contains roast and ground coffee. Thereby, it is conceivable that the further pad is a pad as described in co-pending patent application entitled "Coffee pad with a relatively large outlet opening for use in a coffee machine" which is herewith included by reference. The primary and secondary pads can also have a similar top foil as the first flexible sheet.

To all the pad embodiments described above it applies that some form of packaging will be required for shipment and for extended shelf live. It is for instance possible that the pad is contained in an airtight wrapping prior to use to improve shelf-life. The wrapping may hold one single pad, but also a combination of pads intended to be used in the preparation of one single beverage serving. The pad may also individually comprises a bottom seal. The bottom seal then closes off the outlet side prior to use. The bottom seal is at least partially removable from the bottom of the pad by peeling and can have a lip to enable easy removal by a user of the pad. The pad further needs a top seal that closes off the first sheet prior to use. The top seal is also at least partially removable from the pad by peeling and can also have a lip for easy removal by a user. The removably connected bottom seal and top seal improve shelf life of the product inside the pad by preventing air to enter the pad via inlet and outlet openings. In a special variant the lip of the bottom seal can be connected to the lip of the top seal. Thereby the bottom seal and the top seal can be made unitary, so that a user cannot accidentally forget to remove one of the bottom or top peel seals. When using airtight peel seals, a packaging holding one or more pads then does not have to be airtight. A package for holding one or more pads, may be in the form of a box, can or bag. When in the form of a box or can, the pads can conveniently be arranged in stacks. When the pads are not individually wrapped or provided with peel seals, the package holding a plurality of unwrapped pads needs to provide a barrier to oxygen and humidity. Moreover it may then be desirable to also include one-way valve means to enable any gases, such as emanating from roast and ground coffee, to escape. This would prevent any gas pressures to build up within the package. Such devices are known in the art.

BRIEF DESCRIPTION OF THE DRAWINGS

Further advantageous aspects of the invention will become clear from the appended description and in reference to the accompanying drawings, in which:

FIG. 6 is a perspective view from below of a second embodiment of the pad according to the invention;

FIG. 7 is a detail of FIG. 6 on an enlarged scale;

FIG. 9 is a transverse cross section of the pad of the second embodiment when accommodated in the holder;

FIG. 10 is a detail of FIG. 9 on an enlarged scale;

FIG. 15 is a transverse cross section of the fifth embodiment when accommodated in a holder of a coffee machine;

FIG. 16 is a detail of FIG. 15 on an enlarged scale;

FIG. 20 is a fragmentary perspective view of a coffee machine, including its pad holder, ready to perform a two-step beverage preparation process using at least one pad according to the invention;

DETAILED DESCRIPTION

Figure 1:
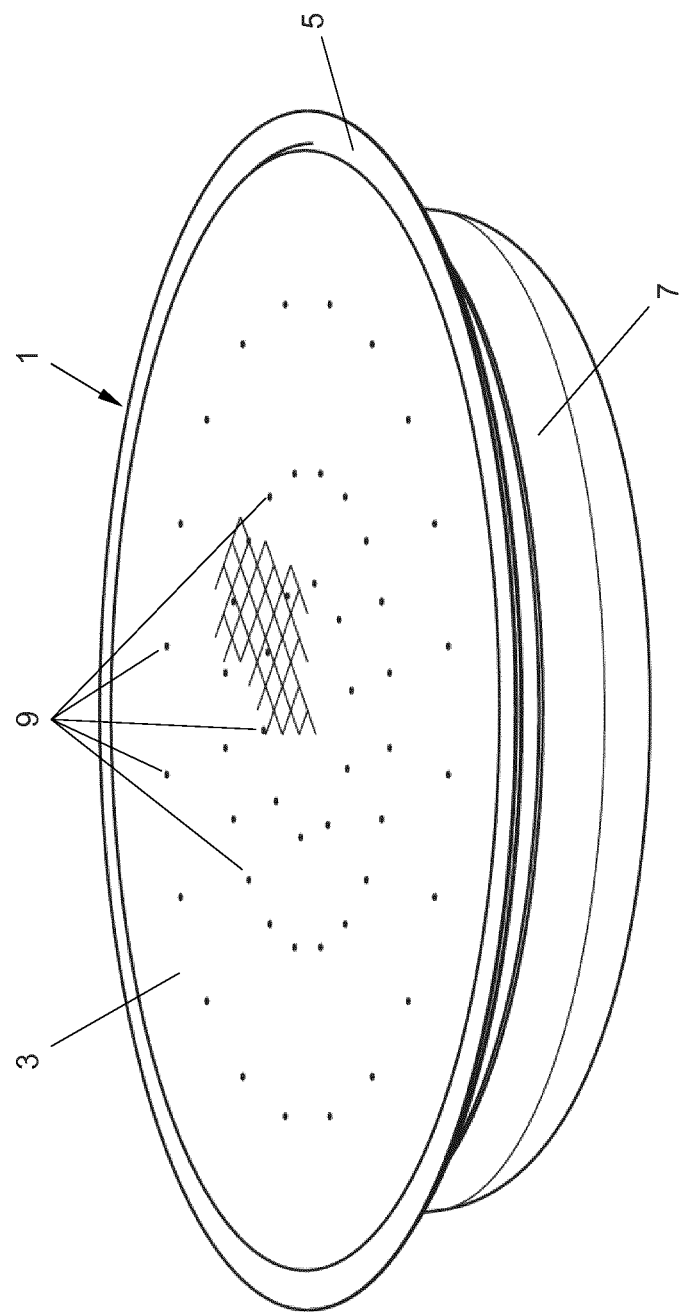
FIG. 1 is a perspective view from above of a first embodiment of the pad according to the invention.

Indicated with reference 1 in FIG. 1 is a first embodiment of pad for use in a coffee machine according to the present invention. A first flexible sheet 3, at a perimeter edge 5 of the pad is attached to a rigid shell 7. The first flexible sheet 3 is a foil that is substantially impermeable to an aqueous fluid, such as water, but has a pattern of, advantageously evenly, distributed inlet openings 9 for allowing fluid to enter the pad 1. The plurality of inlet openings, in use, will cause jets of hot water to enter the pad at spaced locations to assist in dissolving the beverage preparation product. The jets of hot water may also cause swirls to further promote dissolving. It has been determined that inlet opening sizes of 150 to 350 μm, preferably 200 to 300 μm, more preferably about 225 μm and a total number of inlet openings in a range of 35 to 45, give the best yield without a possible blockage of individual inlet openings, or flow resistance in general, becoming a worry.

Figure 2:
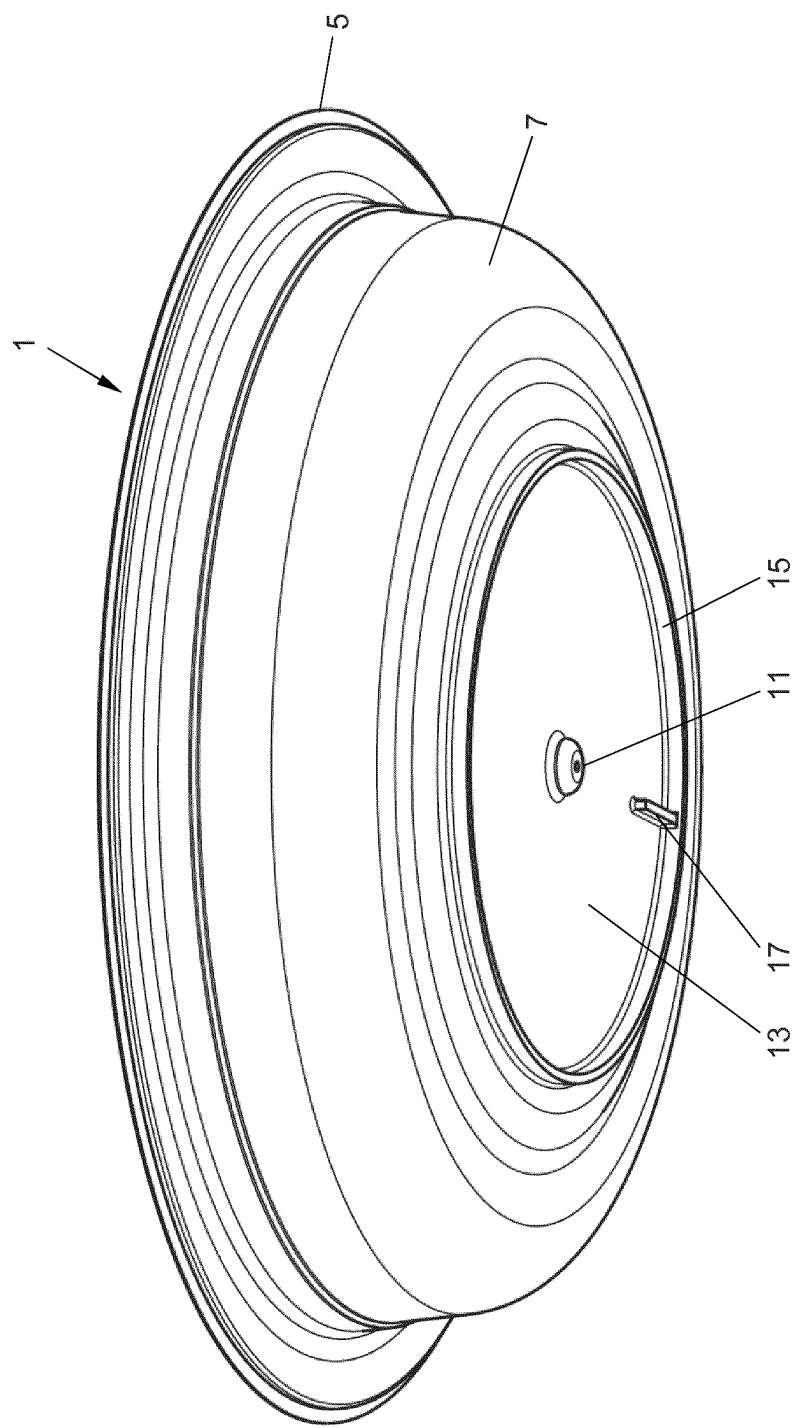
FIG. 2 is a perspective view from below of the pad of FIG. 1.

The pad 1 is shown from below in FIG. 2, where it can be seen that the rigid shell 7 has an outlet opening 11 for allowing the prepared beverage to exit the pad 1. The outlet opening 11 in this example is positioned centrally of a substantially flat bottom part 13 of the rigid shell 7 and protruding downwardly from the flat bottom part 13 is a circular rib or ridge 15. The circular ridge 15 reinforces the bottom of the rigid shell 7, and mates with a bottom of a pad holder, as will be described herein below, to assist in proper placement of the pad. Further an optional positioning protrusion 17 extending inwardly of the circular ridge 15 may be provided at the flat bottom part 13.

Figure 3:
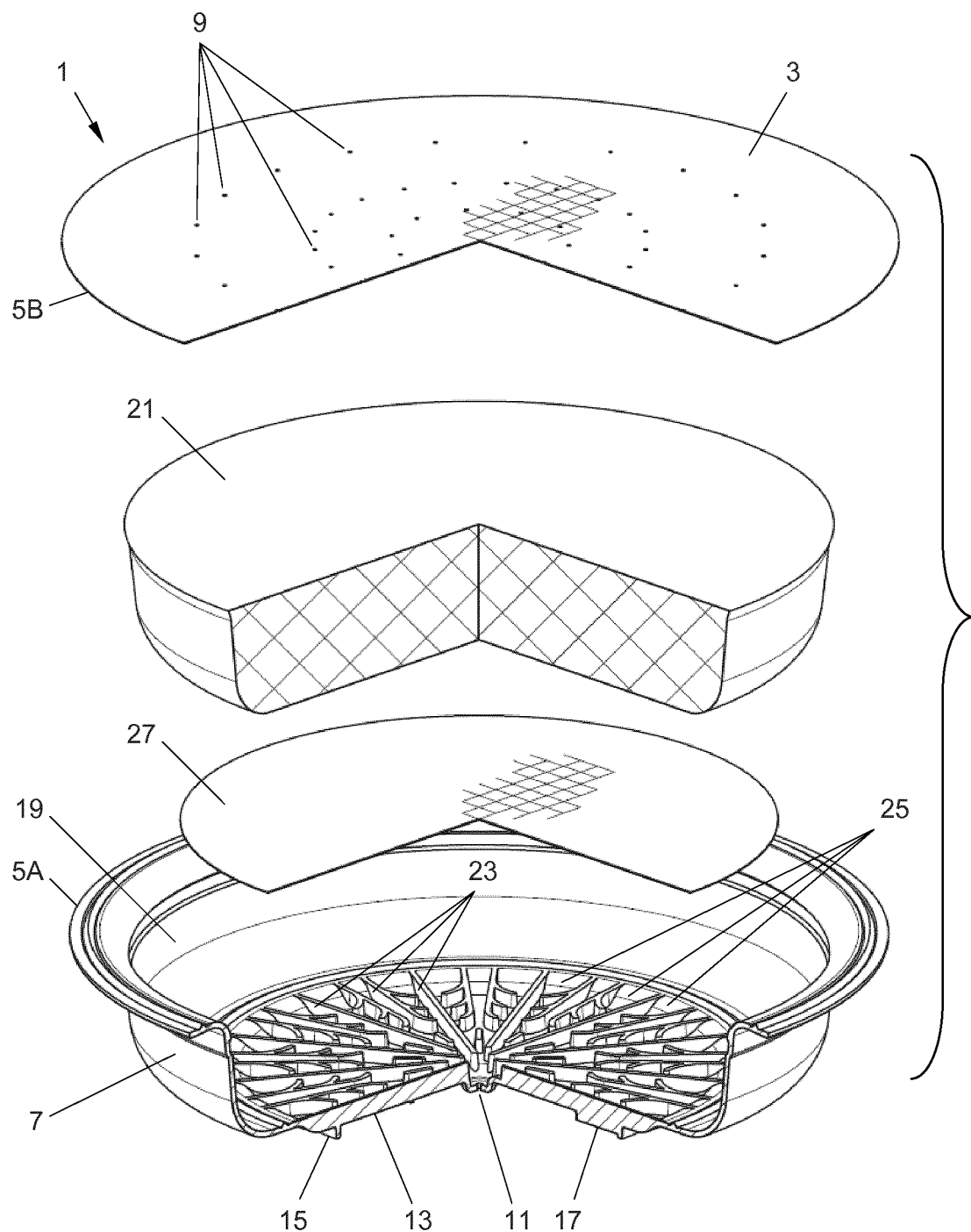
FIG. 3 is an exploded view, partly in cross section, of the components forming the pad of FIGS. 1 and 2.

The construction of the pad 1 will now be explained in reference to FIG. 3 that shows various components thereof in an exploded arrangement. It is seen in FIG. 3 that the rigid shell 7 has an outwardly directed flange 5A to which, on assembly, an outer edge 5B will be attached by welding, heat sealing, or gluing, to form together the perimeter edge of the pad 1. Such bonding techniques are well known to those skilled in the art and need no further explanation.

In a cross sectioned part of the rigid shell 7 shown in FIG. 3 the outlet opening 11 has a diameter of a sufficient size for passing the beverage substantially unrestricted that does not substantially reduce the flow of prepared beverage that can exit from the pad 1 in a given period of time. A standard Senseo® coffee machine, in a default setting, prepares 110-130 ml of beverage using a standard pad. For the at least one outlet opening 11 to allow the beverage to pass substantially unrestricted, it needs to have a diameter of more than or equal to 0.83 mm, and for the present invention preferably within a range from 0.88 to 0.94 mm. The rigid shell 7 is generally bowl shaped and forms an interior space 19 that can accommodate a soluble or dissolvable substance 21. This dissolvable substance 21, which can be an instant coffee, a creamer product, or mixtures thereof is shown as a block having its own integrity. While it is generally possible to press or adhere the soluble material 21 into a tablet to simplify handling, it is preferred that the soluble material 21 is in a loose form. Accordingly the illustration in FIG. 3 is not meant to exclude that the soluble substance 21 can also very well be in a lose powdery form, which is in fact the preferred option. In a bottom of the interior space 19, opposite the flat bottom part 13, is provided a fluid collecting structure comprising a plurality of radial ridges 23 defining channels 25 there between that extend radially with respect to the outlet opening 11. On top of the radial ridges 23 is placed a second sheet 27, which second sheet is a filtering material such as filtering paper or non-woven filtering material. The second sheet 27 rests on top of the radial ridges 23, so that the soluble substance 21 is prevented from obstructing the radial channels 25 when it is not yet fully dissolved.

Figure 4A:
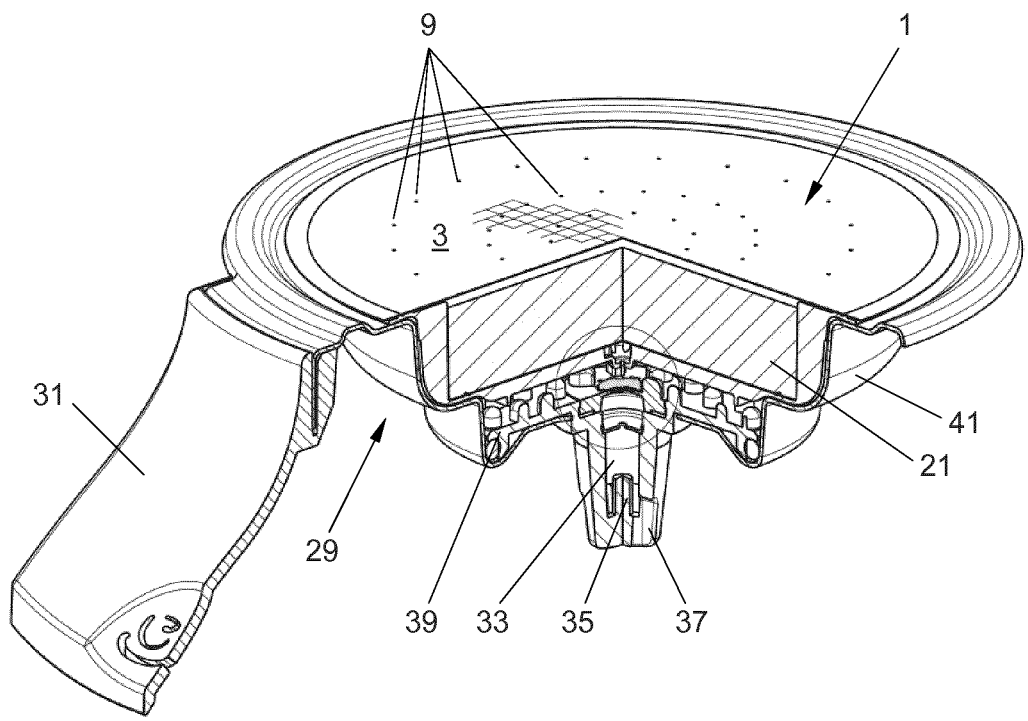
FIG. 4A is a perspective view partly in cross section of the pad according to the first embodiment accommodated in a holder of a coffee machine.
Figure 4B:
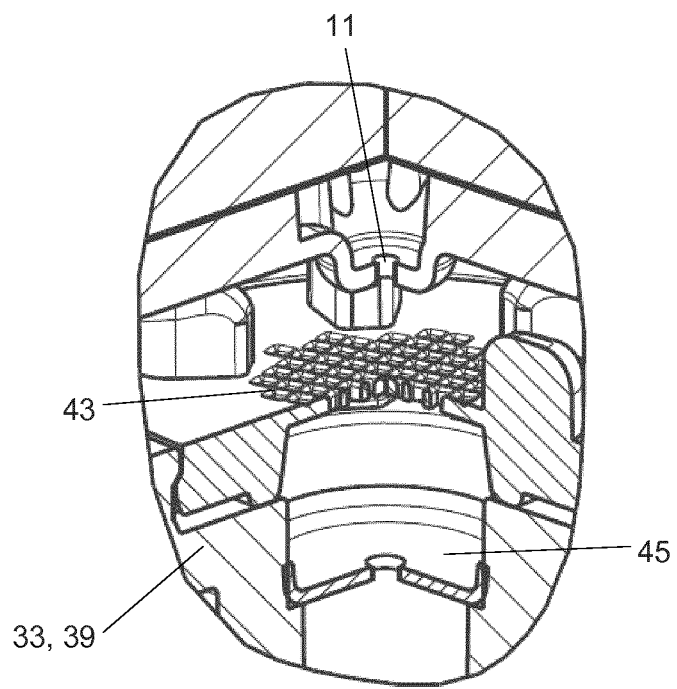
FIG. 4B is a detail of FIG. 4A on an enlarged scale.

FIG. 4 shows the pad 1 inserted and accommodated in a pad holder 29. The pad holder 29 is of a known type as used in coffee machines available under the trademark Senseo®. One characteristic of the known Senseo® coffee machine is that their hot water supply is time controlled during a brewing cycle. Commonly this results in a beverage volume of about 110 to 130 ml using a standard pad. The pad holder 29 has a handle 31, which protrudes from the Senseo® machine (not shown, but conventional) when in use. In use, hot water is offered to the first flexible sheet 3 and will be distributed by the plurality of inlet opening 9 in the first sheet 3. This will result in distributed jets, and possibly also swirls, of hot water in the soluble substance 21 in the interior space 19 of the rigid shell 7. This hot water distribution is useful in preventing the soluble substance to form agglomerates that are difficult to dissolve. The pad holder 21 is provided with an exit funnel 33 which has an impact surface 35 for producing fine bubbled foam under predetermined circumstances. After preparation the beverage will leave the holder 29 through an exit opening 37. The exit funnel 33 of the pad holder 29 is an integral part of a bottom structure 39 positioned in a bowl shaped housing 41 of the pad holder 29. The bowl-shaped housing 41 can advantageously be made of sheet metal, while the bottom structure 39 and the handle 31 are conveniently made of a plastic material. In the enlarged detail of FIG. 4B it can be seen that the bottom structure 39 is provided with a sieve 43 that is positioned directly below the outlet opening 11 of the pad. Arranged in the exit funnel 33 of the bottom structure 39 is a restriction or nozzle 45 which is positioned downstream of the sieve 43, which restriction has a diameter or through-flow area which is smaller than the diameter or through-flow area, respectively, of the outlet opening 11, in particular smaller than 0.83 mm and less than 0.54 mm2. When a laminar flow of beverage is offered to the restriction 45, which acts as a nozzle, a jet of beverage will be formed that impacts upon the impact surface 35 to form a fine bubbled froth layer on top of a drink in a receptacle that will collect the beverage from the exit opening 37. This will normally be the case with a standard Senseo® pad. The jet of beverage exiting the outlet opening 11 may not be completely laminar, depending on the amount of fluid it receives. Even though the jet of beverage exiting from the outlet opening 11, may well be a little turbulent, it is not required for all types of beverage to have foamy head.

Figure 5A:
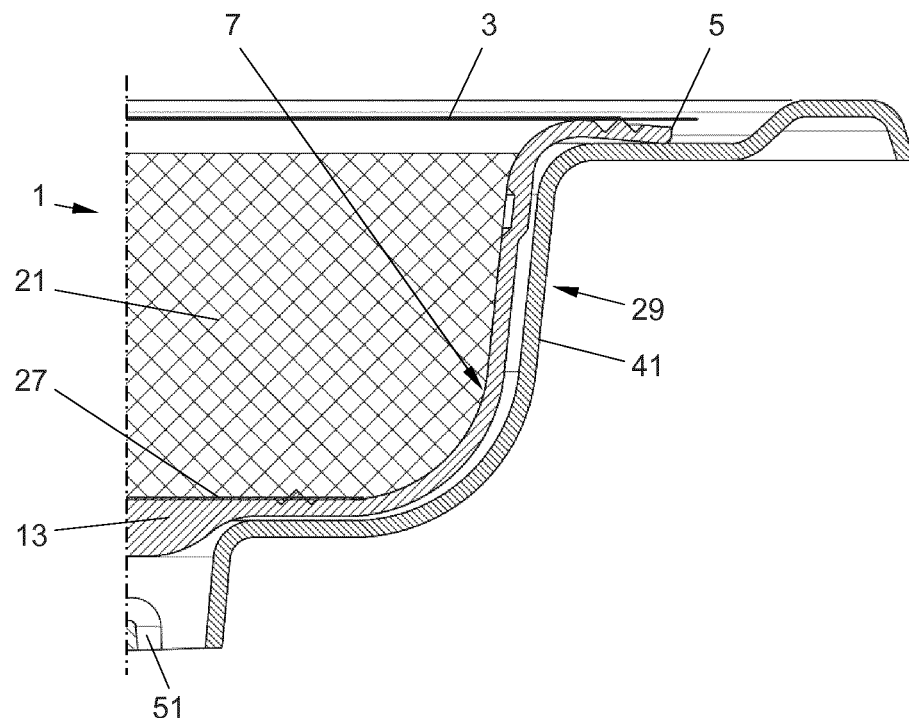
FIG. 5A in a partial transverse cross sectional shows the pad accommodated in the holder, without fluid pressure, and forming a static fluid seal.
Figure 5B:
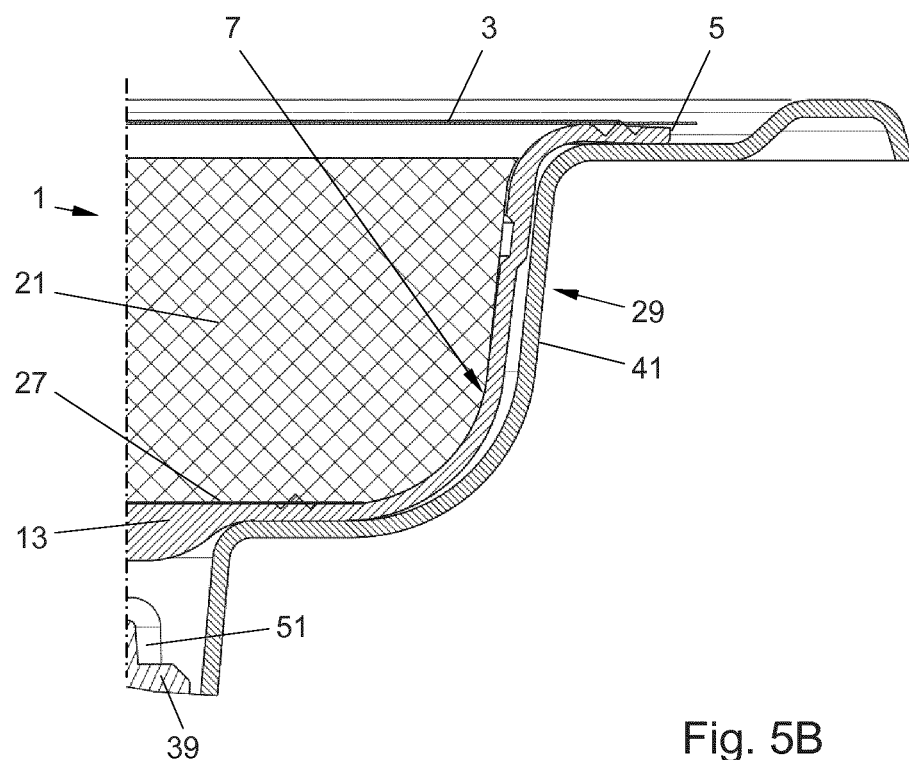
FIG. 5B in a partial transverse cross sectional shows the pad accommodated in the holder, when pressed down by fluid pressure, and forming a dynamic fluid seal.

As best seen in FIGS. 5A and 5B, the pad 1 and the holder 29 form a fluid seal, which is reinforced by the pressure drop over the pad 1 and by properties of the rigid shell 7, that permit the shell 7 to soften slightly at the brewing temperature and conform its shape to that of the bowl shaped housing 41 of the pad holder 29. In FIG. 5A the pad 1 is shown when accommodated in the pad holder 29, without fluid pressure, and forming a static fluid seal. The static seal between the pad 1 and the holder 29 is formed between an outwardly directed perimeter flange of the pad 1 at its outer perimeter edge 5 and a confronting outwardly directed flange of the holder 29. Sufficient static sealing may already be obtained by gravity through the weight of the pad 1 being supported on the outwardly directed flange of the holder 29 via the outer edge 5 of the pad 1. As shown in FIG. 5A the outwardly directed perimeter flange of the shell 7, inclines slightly downwardly in an outward direction, so that initial contact with the flange of the holder 29 will be through the outermost perimeter edge 5 of the pad 1. It is further seen in FIG. 5A that still a gap exists between a remainder of the rigid shell 7 and the bowl-shaped housing 41 of the holder 29. In FIG. 5B the pad 1 in the holder 29 is shown, when pressed down by fluid pressure and forming an additional dynamic fluid seal, in that the flat bottom part 13 of the shell 7 now firmly contacts the bottom of the holder 29. Initial contact between the flat bottom part of the shell 7 and the bottom of the holder 29 will start at a point where the housing 41 of the holder 29 bends away toward the bottom structure 39. At this point the deflection of the shell 7 under pressure forces its bottom part 13 against the holder 29. The dynamic seal uses the fluid pressure to improve contact between the shell 7 and the holder 29. The more pressure drop there is across the pad 1 during brewing, the higher the contact pressure will be between the flat underside of the shell 7 and the pad holder 29. It is thereby prevented that the hot water that has been fed to the top of the pad 1 can flow directly to the outlet 11 of the holder 29 by bypassing the pad 1. The beverage thus can only flow through the outlet 33 of the holder 29.

Figure 8:
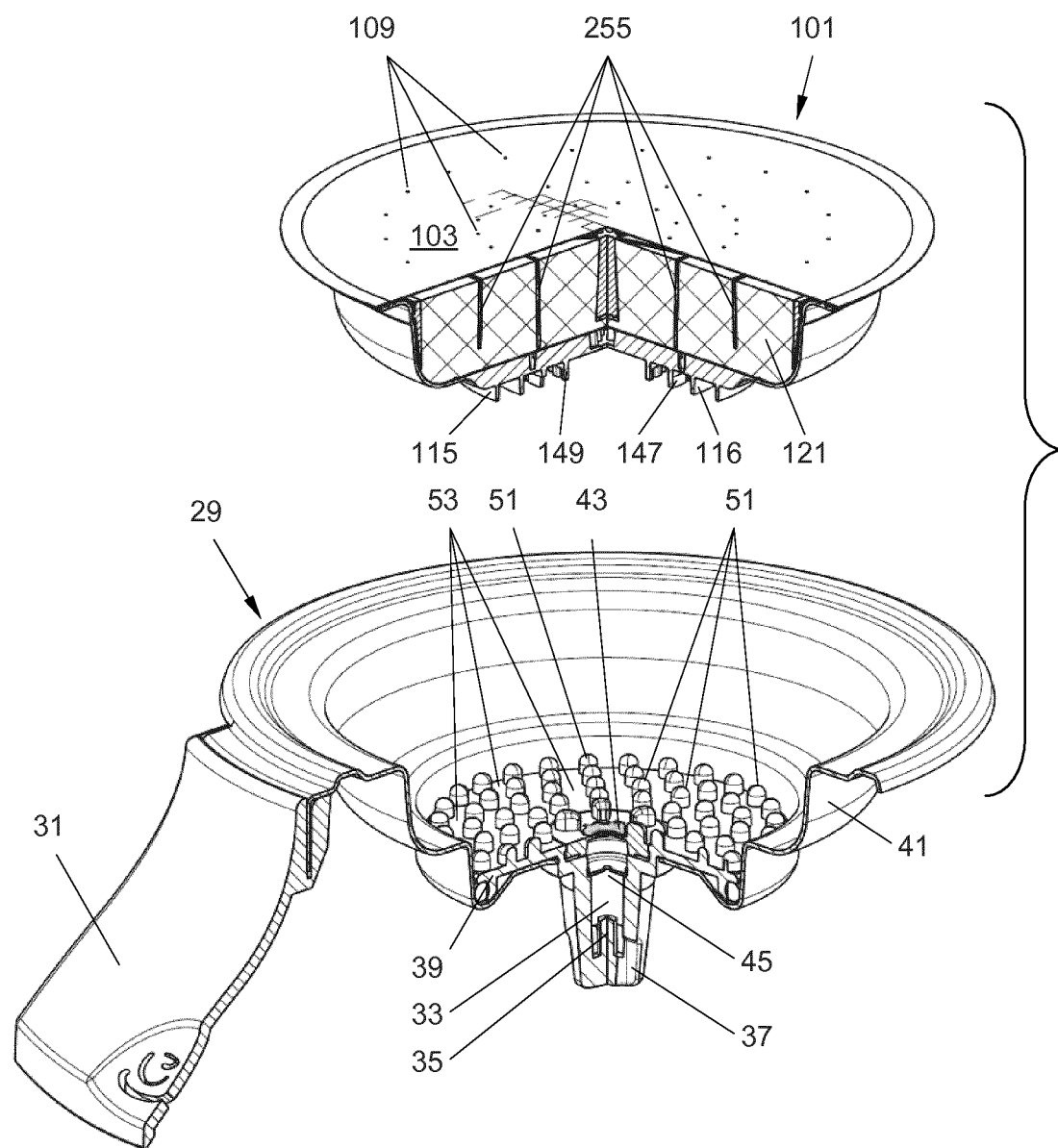
FIG. 8 is an exploded arrangement, partly in cross section of the pad according to the second embodiment in position to be inserted into the holder of a coffee machine.

For those cases in which a foamy head is required on the beverage, while using the pad according to the invention a second embodiment of pad 101 will now be described in reference to FIGS. 6-10. As shown in FIG. 6 the pad 101 of the second embodiment has a perimeter edge 105 which is defined by an outwardly extending flange 105A of a rigid shell 107, similar to the first embodiment. Parts of the second embodiment that are similar to the first embodiment will be denoted by reference numerals that are a full "100" higher than those used in FIGS. 1-5B, except for the holder 29, which is identical for all embodiments. It is further seen in FIG. 6 that the bottom part 113 has a first circular ridge 115 extending downwardly therefrom, as well as a second circular ridge 116 positioned inwardly thereof. Inwardly of the second circular ridge 116 is positioned an outer slotted ridge 147. Inwardly of the outer slotted ridge 147 is a further inner slotted ridge 149. The outer and inner slotted ridges 147, 149 are interrupted by a plurality of evenly spaced slots 151 for allowing a fluid to pass there between. As further shown in FIG. 6, and in the enlarged detail of FIG. 7, a outlet opening 111 is positioned excentrically in the flat bottom part 113 of the rigid shell 107. This outlet opening 111 has a diameter which is larger than the diameter of the restriction 45 in the pad holder 29, and in particular has a diameter which is at least 0.83 mm. In FIG. 8 it is illustrated how the pad 101 of the second embodiment will be positioned in a standard pad holder 29 of a Senseo® machine. The pad holder 29 of FIG. 8 can be identical to the pad holder 29 of FIG. 4 and hence the same reference numerals will be used for the pad holder 29. The bottom structure 39 of the pad holder 29 is provided on its upper surface with a plurality of upwardly projecting nipples 51 defining several concentric circular voids 53 there between. The downwardly protruding circular ridges 115, 116, 147, 149 of the pad 101, when positioned in the bowl shaped housing 41 of the pad holder 29, will be accommodated in these concentric voids 53. In the transverse cross section of FIG. 8 the pad 101 is shown when accommodated within the pad holder 29, When hot water has entered the plurality of inlet openings 109 in the first sheet 103 of the pad 101 (FIG. 8), the beverage component with soluble substance 121 dissolved therein will be pressed through the outlet opening 111 and enter a labyrinth formed by the ridges 115, 116, 147, 149 protruding upwardly from the bottom of the pad 101 and the nipples 51 protruding from the bottom structure 39 of the pad holder 29. More in particular the continuous first and second circular ridges 115, 116 are positioned outwardly of the outlet opening 111 and will oppose the beverage fluid to flow outwardly. However the outer and inner slotted ridges 147, 149 will promote the beverage fluid to flow inwardly of the labyrinth towards the sieve 43 of the exit funnel 33 of the pad holder 29. The result is that any flow exiting from the outlet opening 111, whether turbulent or laminar, will be conducted and/or converted to ensure that a laminar flow exists by the time it reaches the exit funnel 33. This laminar flow causes a jet produced by the restriction 45, acting as a nozzle, in the exit funnel 33 to form a homogeneous fine bubble froth when it hits the impact surface 35 before leaving the exit opening 37 of the pad holder 29. The arrangement is further illustrated in the enlarged cross sectional detail of FIG. 10. As will be clear from the above the labyrinth diverts a plurality of times the flow of the beverage from the outlet opening of the pad.

Further it is seen in FIGS. 8 and 9 that the interior of the pad 101 can optionally be provided with separating walls 255. That is to say that the separating walls in the pad 101 could also have been deleted as these are not related to the labyrinth means for obtaining a laminar flow.

Figure 11:
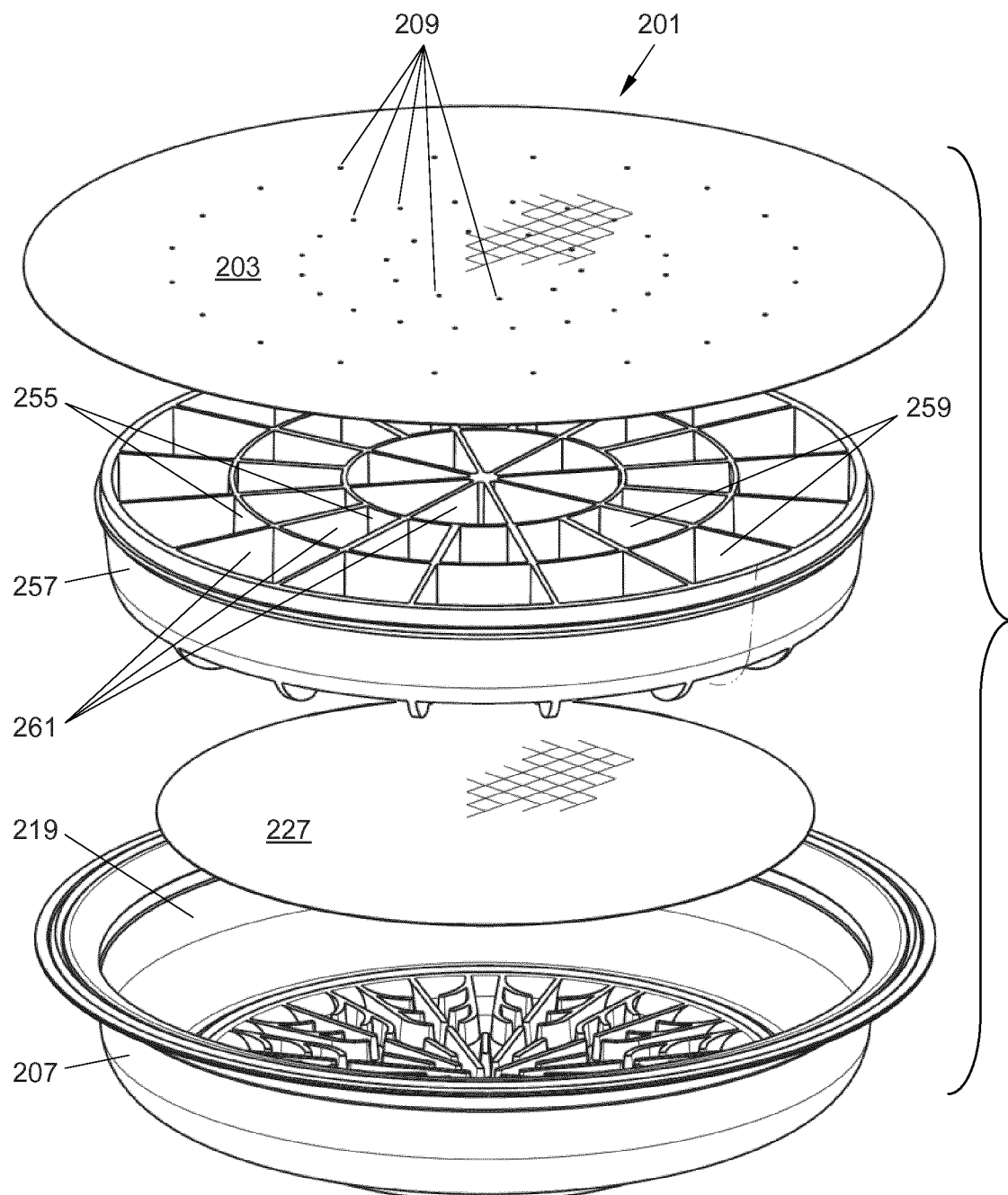
FIG. 11 is an exploded view showing components of a third embodiment according to the invention, still without soluble product.

The separating walls 255 are part of an optional rigid grid structure 257, which is shown in more detail in FIG. 11. The rigid grid structure 257 is part of a third embodiment of pad 201 according to the invention, which features can be combined at will with any of the other embodiments. The rigid grid structure 257 in addition to concentric separating walls 255, also has radially extending walls 259, which between them define a plurality of grid cells 261. The rigid grid structure 257 is positioned in the interior space 219 of the rigid shell 207, where it will share the space with a soluble substance, which for clarity is not shown in FIG. 11. The rigid grid structure 257 is also positioned between the first flexible sheet 203 and the second sheet 227, which second sheet 227 covers a fluid collecting structure in the bottom of the rigid shell (as explained in reference to FIG. 3). A primary purpose of the grid structure 257 is to support the first flexible sheet 203 and prevent this from sagging and contacting the soluble substance (21, 121 in FIGS. 3-10). It has been found that contact between the first sheet and the soluble substance may cause undesirable agglomeration of the powdery substance. Sagging can generally also be prevented by applying pre-tension, or by slightly stretching the first sheet prior to its attachment to the shell. Alternatively such tension may also be achieved by allowing the first sheet 203 to shrink after being attached without tension or with only insufficient tension. While a taut underside of the first sheet 203 helps in preventing clogging of soluble products, such as creamer powders, the first sheet 203 may also be provided with a hydrophobic surface on its underside. Another factor in this regard is also the amount of available headspace above the soluble product, but in practice this is mostly minimal in view of the necessary degree of filling in the prevailing space conditions. However, additional support can be necessary when the tension of the first sheet 203, or its elasticity is so low that a risk of sagging is present. A secondary purpose of the grid structure 257 may be that the grid cells 261 formed between the concentric walls 255 and radial walls 259 may assist in the homogeneous dissolving of the soluble substance in combination with the inlet openings 209. Tuning of the number, position, and size of the inlet openings 209 in relation to the number and size of the grid cells 261 may further enable the optimization of different soluble substances, such as different creamers, instant coffees, and/or mixtures thereof.

Figure 12:
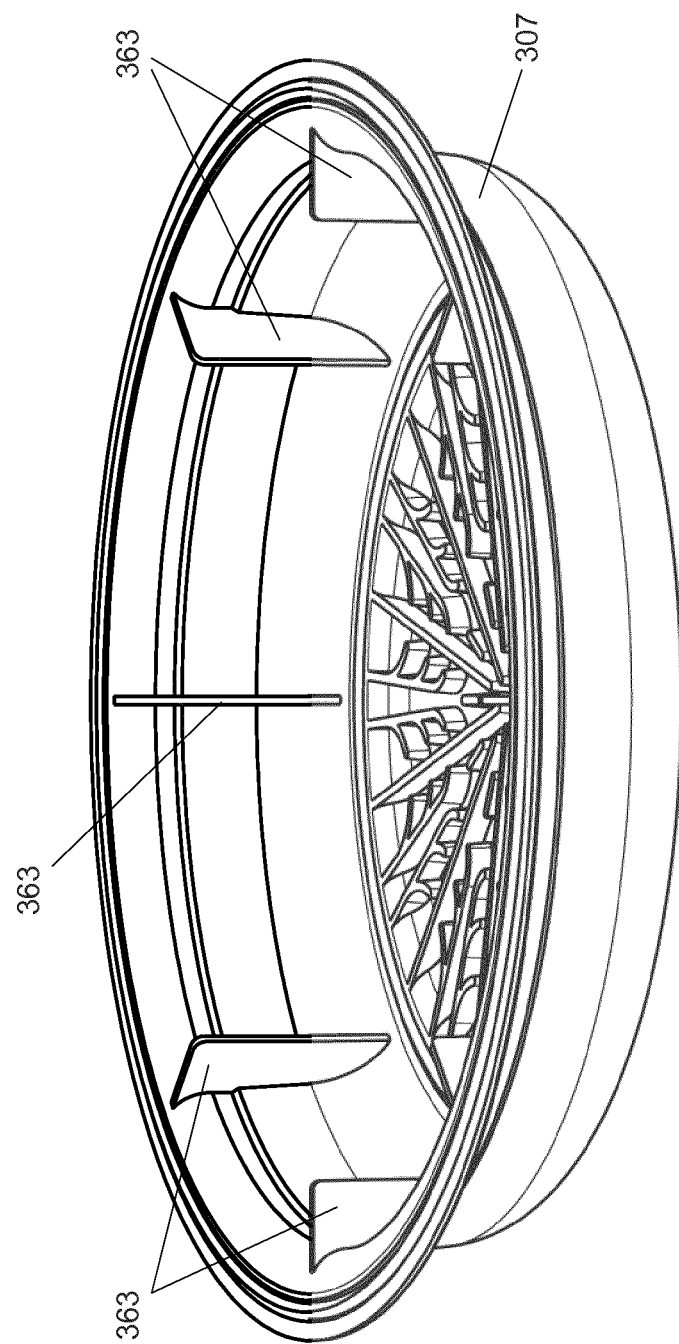
FIG. 12 is a perspective view from above of a fourth embodiment of the pad according to the invention.

In an alternative arrangement as illustrated in FIG. 12, a rigid shell 307 may also be provided with integrally formed support walls 363 for supporting the first sheet (deleted from FIG. 12 for clarity but identical with the other embodiments). As with the embodiment of FIG. 11, that of FIG. 12 can also be combined at will with any of the other embodiments. In the example of FIG. 12 the support walls 363 extend inwardly only to the outer boundaries of the bottom of the rigid shell 307, to enable a second sheet (not shown, but similar to 27, 127, and 227 of the previous embodiments) to be positioned on the fluid collecting structure in the bottom of the rigid shell 307.

Figure 13:
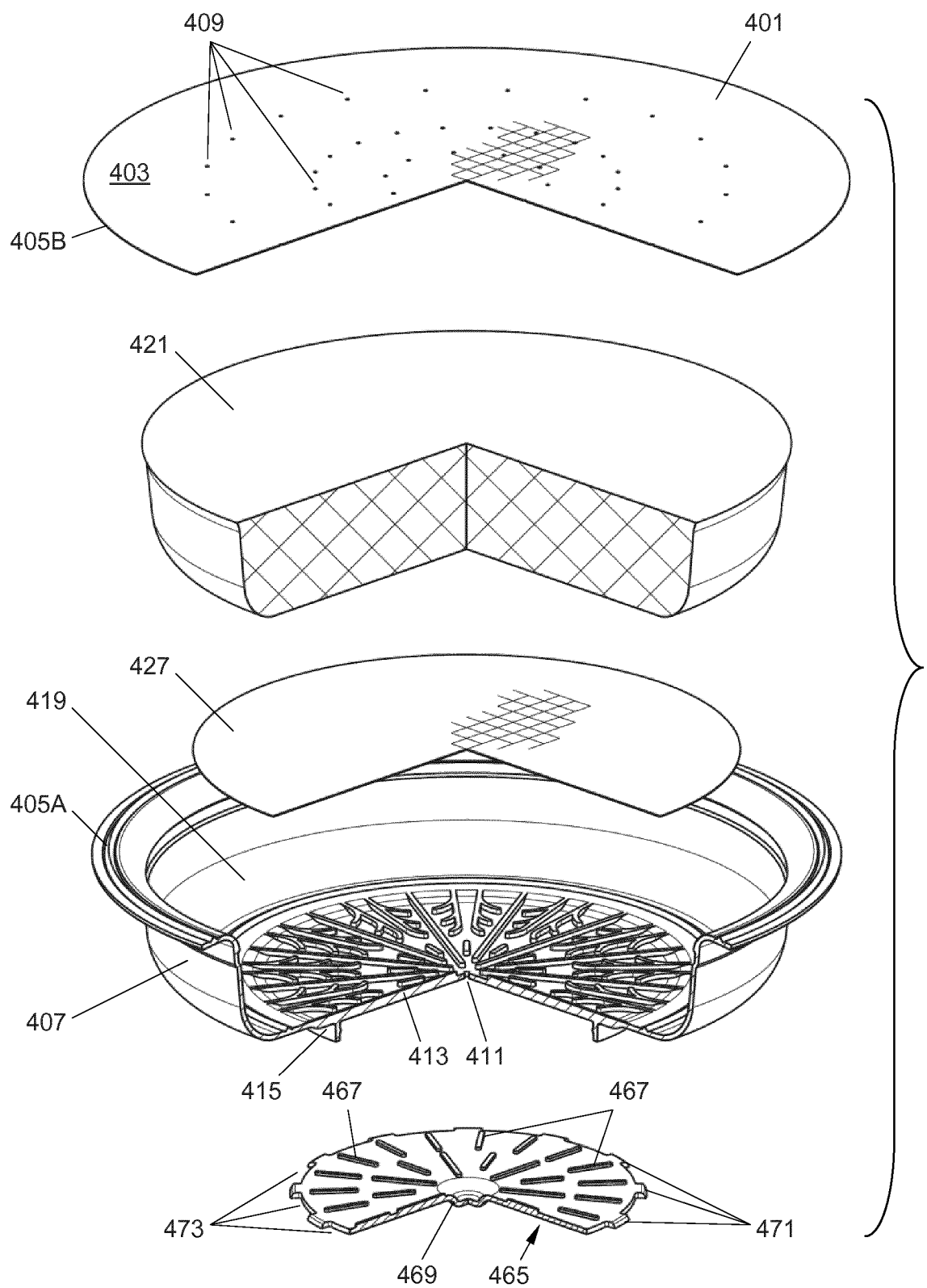
FIG. 13 is an exploded view of a fifth embodiment of pad according to the invention.

While means for establishing a laminar flow of the beverage have already been described in the form of a labyrinth used in the embodiment of FIGS. 6-10, further such means will now be described in reference FIGS. 13-16. In the example of FIG. 13 a pad 401 is equipped with an additional deflector plate 465. The deflector plate 465 attaches to the flat bottom part 413 of the pad 401, which is otherwise similar to pads described hereinabove. Generally the pad 401 thus comprises a first sheet 403 provided with a pattern of inlet openings 409. The first sheet, when the pad 401 is assembled, has its perimeter edge 405B adhered to a perimeter flange 405A of the rigid shell 407 thereby defining an interior space 419 for occupation by a soluble substance 421. The soluble substance 421 rests on top of a second sheet 427, which in turn covers a fluid collecting structure in the bottom part 413 of the rigid shell 407. The deflector plate will be attached to the circular ridge 415 that extends downwardly from the bottom 413 of the rigid shell 407. It is further seen in FIG. 13 that the upper surface of the deflector plate 465 is provided with a plurality of radial spacer ribs 467 for defining an outwardly expanding flow area for a beverage exiting the outflow opening 411 having a diameter which is larger than the diameter of the restriction 45 of the pad holder 29, in particular a diameter of at least 0.83 mm. A jet of beverage leaving the outflow opening 411 will first be collected in a collecting recess 469 before spreading radially outwardly over the upper surface of the deflector plate 465. At its outer periphery the deflector plate is further provided with alternating protrusions 471 and recesses 473. The recesses 473 will allow the laminar flow after its conversion from a somewhat less laminar flow to exit the pad 401 through the recesses 473 as will be further clarified in FIGS. 14-16. Hence the means for establishing a laminar flow is arranged to provide, in use, a shortest flow path for the beverage, which extends between the at least one outlet opening of the pad and the at least one exit opening of the holder. This flow path created by the deflector for deflecting the beverage flow from the outlet opening of the pad is longer than a shortest flow path for the beverage, as it would extend between the outlet opening of the pad and the exit opening of the holder without the means for establishing a laminar flow.

Figure 14:
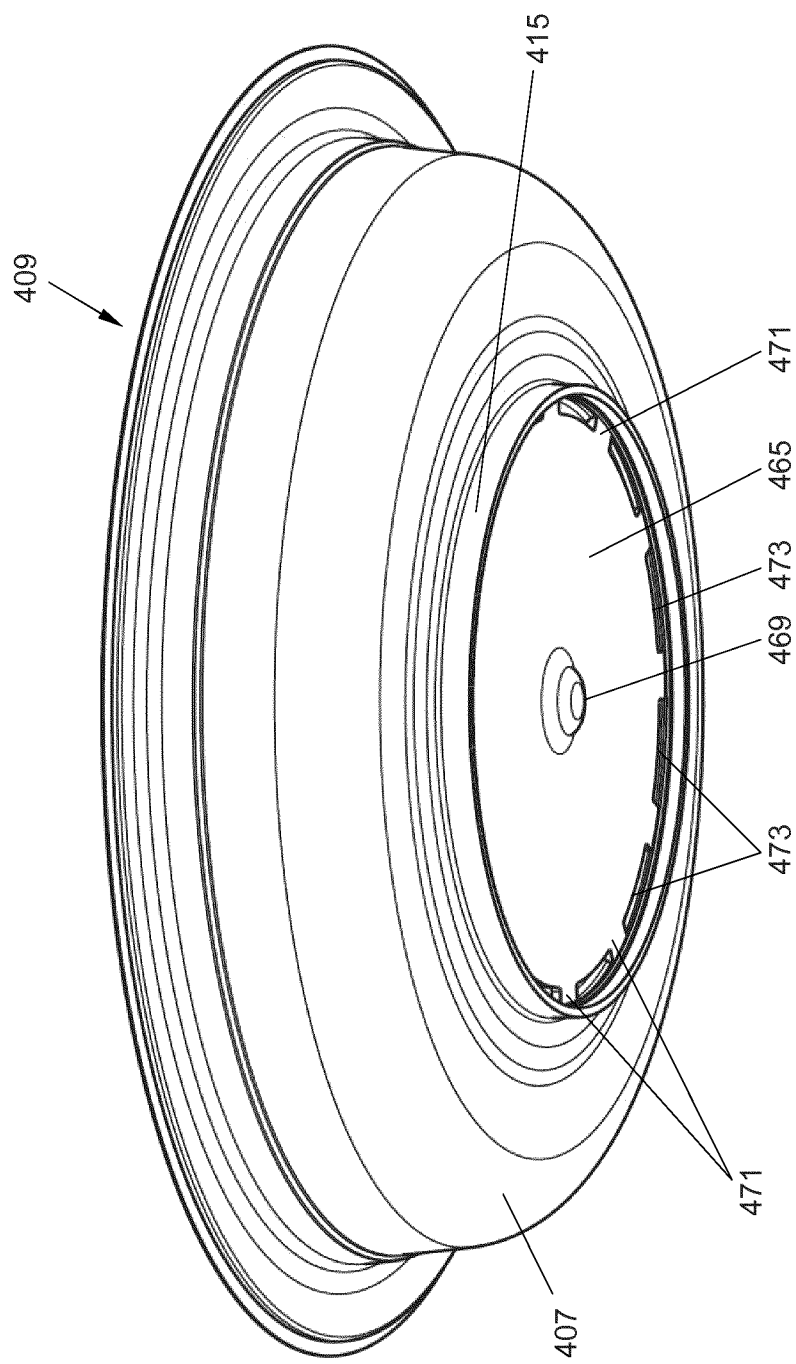
FIG. 14 is a perspective view from below of the pad of the fifth embodiment.

In FIG. 14 the pad 409 according to the fifth embodiment is shown from below with the deflector plate 464 shown in its attached position. Attachment of the deflector plate 465 to the circular ridge 415 can be by glue or by a suitable snap-fit connection, using the protrusions 471 at the perimeter thereof. With the deflector plate 465 in its attached position the recesses 473 form a plurality of outlet openings adjacent the inner periphery of the circular ridge 415. The collecting recess 469 is closed at the bottom of the pad 409 so that all fluid exiting from the outlet opening 411 (see FIG. 6) is forced to expand radially outwardly to the plurality of outlet openings formed by the recesses 473. FIGS. 15 and 16 show transverse cross section of the pad 409 when accommodated in the pad holder 29 of a Senseo® machine. The relevant individual elements are indicated in FIG. 15, but have already been discussed hereinabove. The detail view of FIG. 16 shows the relative position of the bottom pad 413 and the deflector plate 465 and its collector cavity 469 with respect to the bottom structure 39 of the pad holder 29. It is clear from FIG. 16 that the collecting cavity 469 is positioned above the sieve 43 of the pad holder. The fluid jet exiting the outlet opening 411 in the bottom part 413 of the pad 409, after filling the collector cavity 469 is spread-out over the deflector plate 465 and between the radial spacer ridges 467 towards the perimeter openings 473. From the inner perimeter of the circular ridge 415 the fluid seeks its way inwardly over the bottom structure 39 of the pad holder 29 towards the sieve 43 and the exit funnel 33. In the exit funnel a jet of beverage fluid may be formed by the further restriction 45, which then acts as a nozzle, to hit upon the impact surface 35 to create fine bubbled foam.

Figure 17:
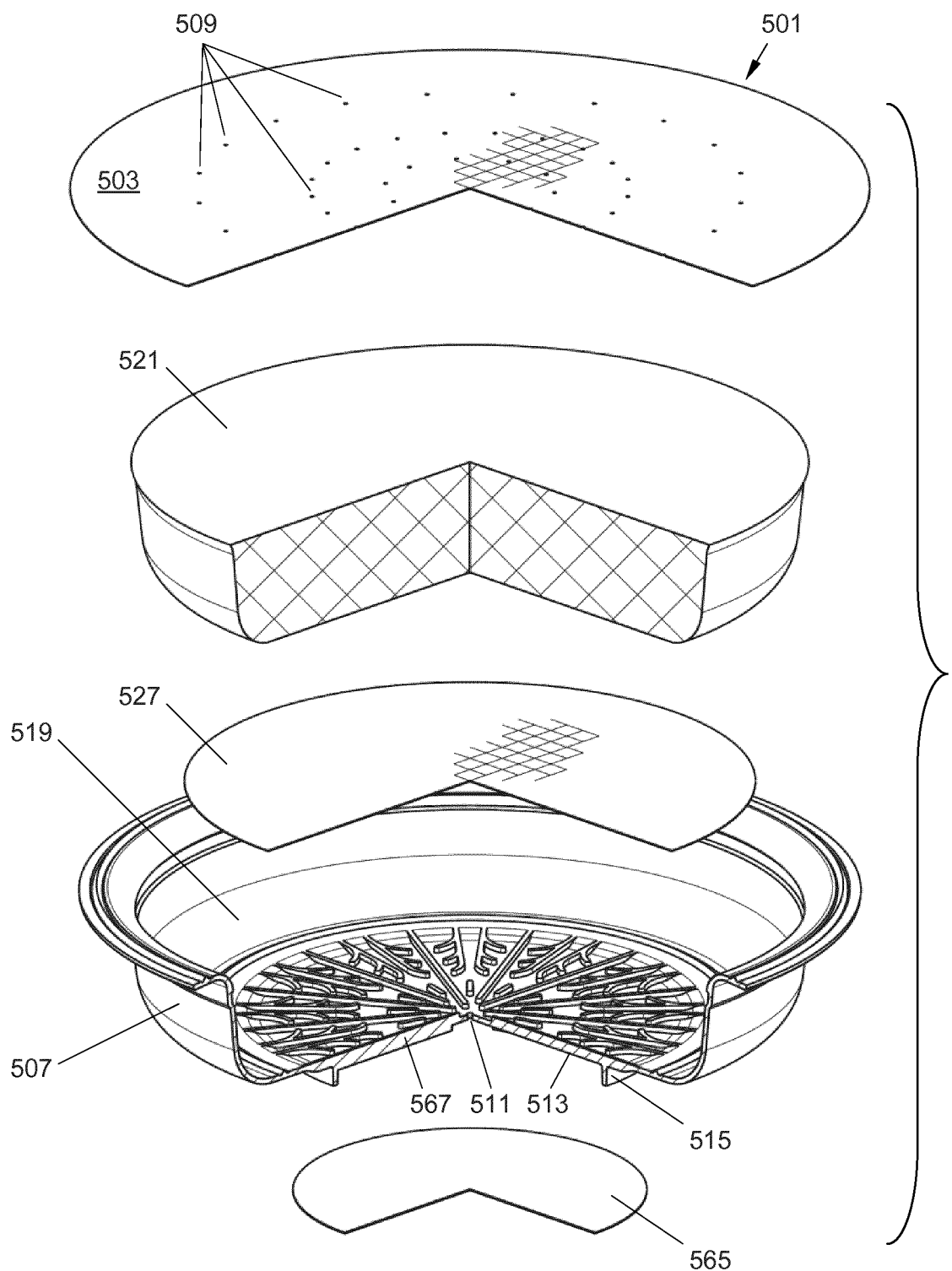
FIG. 17 is an exploded view, partly in cross section, of a sixth embodiment of pad according to the invention.
Figure 18:
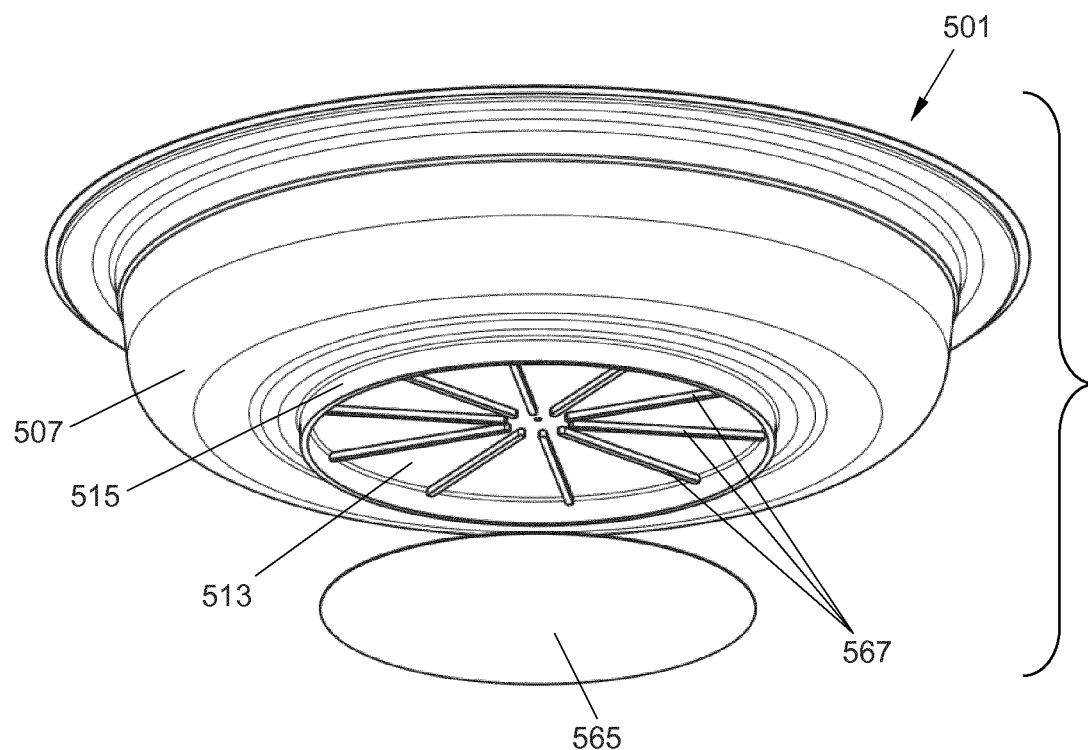
FIG. 18 is an exploded view from below of the sixth embodiment of pad.
Figure 19:
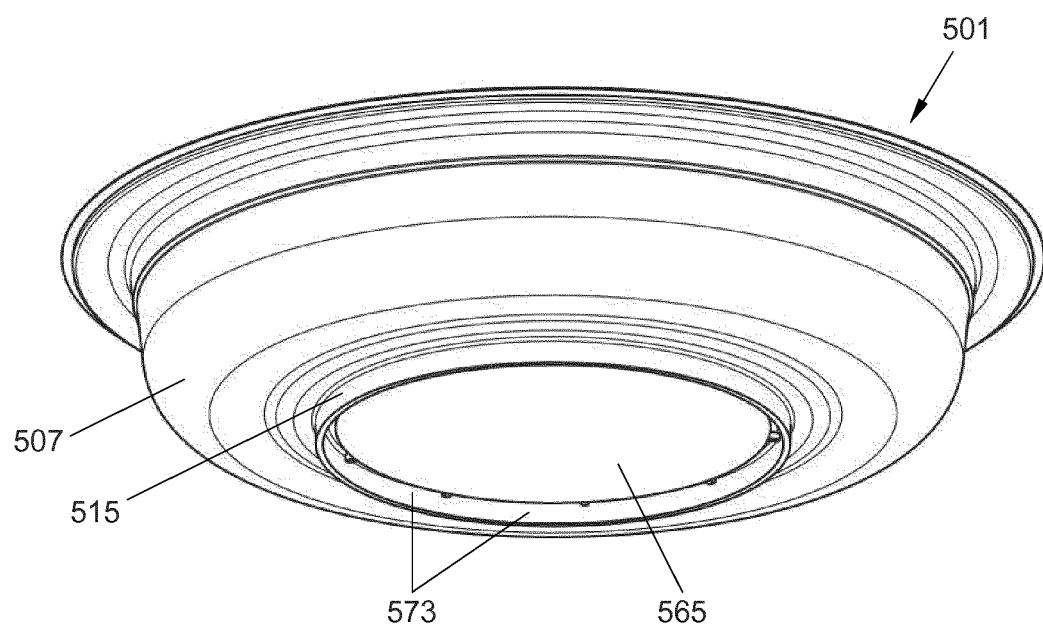
FIG. 19 is a perspective view from below of the sixth embodiment when fully assembled.

A further sixth embodiment of pad 501 is shown in FIG. 17, in an exploded arrangement prior to assembly. In common with the other embodiments are a first flexible sheet 503 with a plurality of inlet openings 509, a soluble substance 521, a second flexible sheet 527 and a rigid shell 507 to create the interior space for accommodating notably the soluble substance 521. As has also been described in reference to the other embodiments the bottom part 513 of the rigid shell 507 is provided with a fluid collecting structure of radial channels for guiding the beverage of dissolved beverage ingredient towards the outlet opening 511 having a diameter of at least 0.83 mm. The means for creating a laminar flow in this example are embodied as a deflector foil 565, which is attached to radial spacing ridges protruding from the bottom part 513, as best shown in FIG. 18. Attachment of the deflector foil 565 may be by welding, heat sealing or gluing. As shown in FIG. 19 the diameter of the deflector foil 565 is slightly smaller than a diameter defined on its interior space by the circular ridge 515, so that a perimeter gap 573 remains between the perimeter edge of the deflector foil and the interior space of the circular ridge 515, to allow a laminar flow of a beverage part to flow over the bottom of the pad holder in a manner similar to that described in relation to FIGS. 15 and 16. The deflector foil 565 of the sixth embodiment may have advantages over the deflector plate 465 of the fifth embodiment, in that it would be cheaper to manufacture.

In FIG. 20 a Senseo® coffee machine 675 is shown. This coffee machine 675 has a time controlled water supply from a water storage container 677 via a lid 679 that is pivotally attached to close down on a pad holder 29 after a primary pad 601 for preparing a first part of a beverage serving. For preparing the first part of the beverage serving the primary pad 601 is a pad according to one of the examples described hereinabove, with a outlet opening in a rigid shell of the pad having a diameter of at least 0.83 mm.

As a result of the outlet opening (11, 111, 411, 511) in combination with the restriction 45 in the pad holder 29 the time controlled water supply can be set to a total volume of more than about 95 ml, preferably 110-130 ml, in particular to 120 ml. With this amount of total volume a two-step process can be used to prepare a single beverage serving from two different pads. To this end FIG. 20 also shows a secondary pad 701 for such a two-step process. After the first beverage part is dispensed from dispersions spout 681, the lid 679 is opened again and the primary pad 601 is then replaced by the secondary pad 701. Again the secondary pad 701 may also be one of the pads described hereinabove with a outlet opening (11, 111, 411, 511) having a diameter of at least 0.83 mm. Such a two-step process may be useful to obtain a cappuccino, a latte macchiato, a Wiener Mélange, or like drinks. When preparing such drinks it is advantageous to use as a primary pad 601 a pad filled with a creamer substance. The secondary pad 701 may then be a pad containing only roast and ground coffee, only instant coffee, or instant coffee with roast and ground coffee and/or additional creamer. It is found desirable that so called "white foam", formed with the first beverage part from the primary pad 601, will float on the second beverage part containing coffee. A beverage with visual separate layers will then be obtained. It is therefore not necessary for the second beverage part to produce additional foam and hence a laminar flow is not required for the secondary pad 701. Nonetheless a foam layer formed by the secondary pad 701, even if imperfect, can be beneficial in creating additional volume in the beverage below the foamed creamer layer. Such added volume may well be obtained from a turbulent flow.

Figure 21:
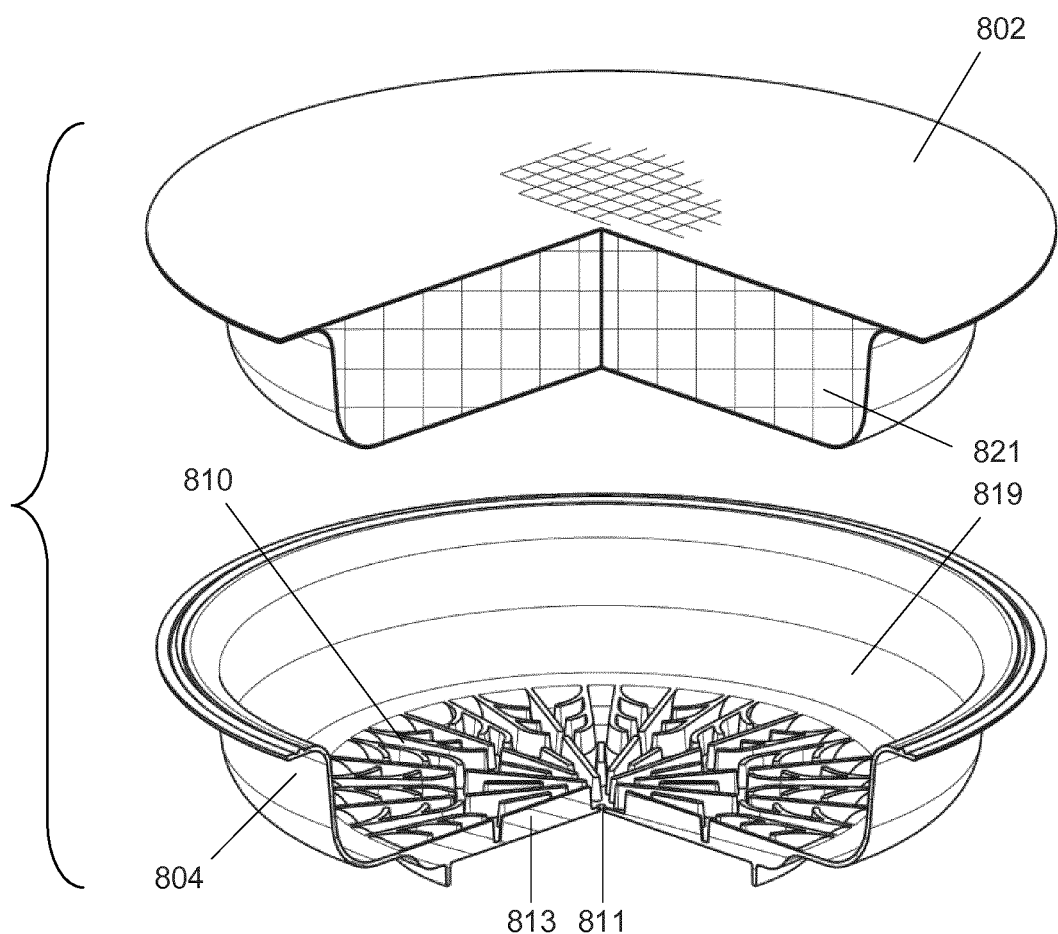
FIG. 21 is an exploded view of a further alternative of the invention in the form of a first adapter.

In FIG. 21 a further addition to the invention, in conjunction with a system for performing the two-step process, is shown in the form of a first adapter 804 for accommodating a soft standard Senseo® pad 802, or a soft pad compatible with the Senseo® system. The first adapter 804 can be very similar in shape to the rigid shells described above in that it defines an interior space 819 that will accept a standard soft pad 802 filled with a substance to extract 821 enclosed in a filter pouch. A bottom part 813 of the first adapter 804 is provided on its upper surface with a beverage collecting and guiding structure 810 which may be formed by ridges and channels, but also by using a porous element. In this alternative the outlet opening 811 in the bottom part 813 ensures that an amount of beverage is obtained comparable to that from the standard pad 802.

Figure 22:
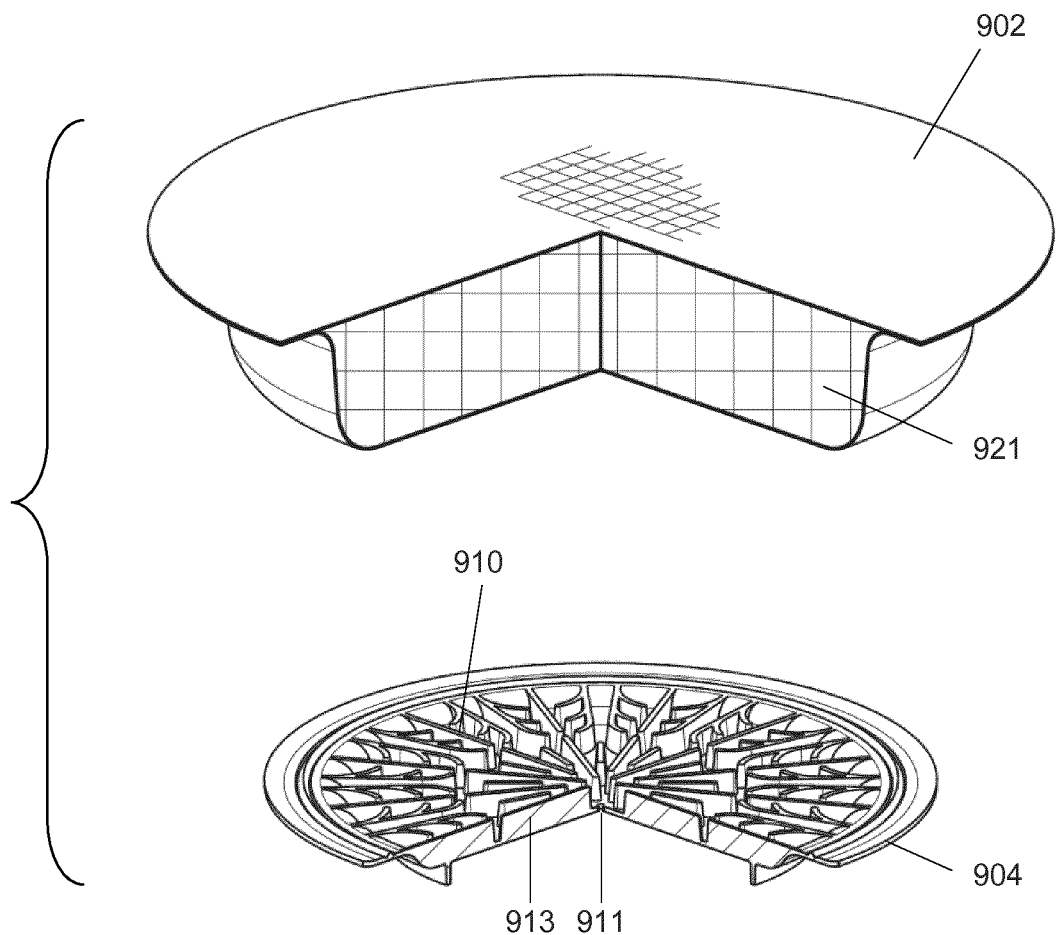
FIG. 22 is an exploded view of a variation of the adapter of FIG. 21.

In FIG. 22 a variation of the adapter of FIG. 21 is proposed. This adapter references as 904 can be placed on the bottom structure 39 of the Senseo® pad holder 29 described hereinabove. After placing of the second adapter 904 in the pad holder a standard soft pad 902 can be placed on top of the adapter 904 in the pad holder. The standard soft pad 902 is again one that is suitable for functioning in the Senseo® coffee machines and comprises a pouch of filtering material filled with a substance to extract 921.

Similar to the first adapter variant 804, the second adapter variant 904 also has a beverage collecting and guiding structure 910 on an upper surface of a bottom part 913 to guide the beverage to a outlet opening 911.

Other variants are described in co-pending patent application entitled "Adaptor for use in a coffee machine", which is herewith included by reference.

In the two-step process described hereinabove it is also possible that at least one of the primary and secondary pads is formed by a standard pad combined with one of the first adapter 804 or the second adapter 904.

Figure 23:
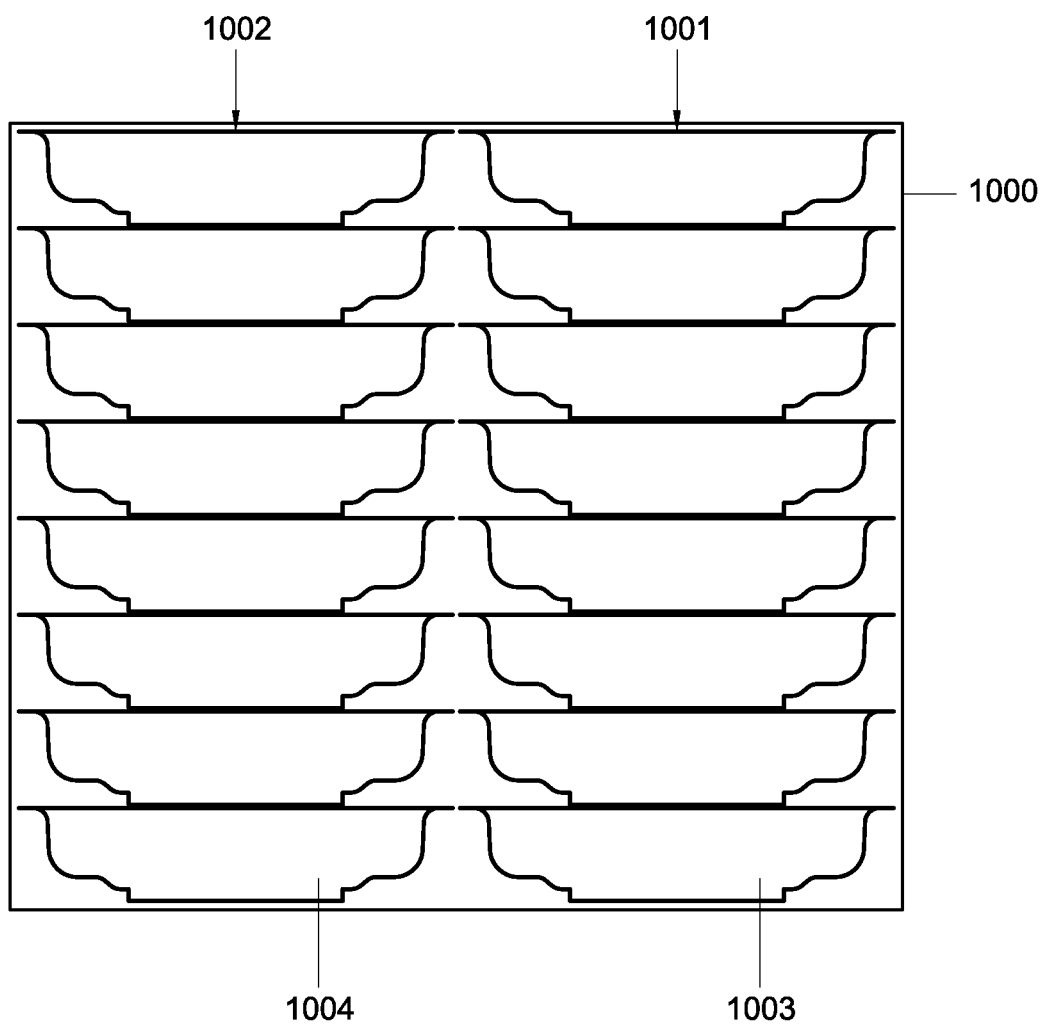
FIG. 23 schematically illustrates one possible form of packaging.

In FIG. 23 one possible form of packaging is schematically illustrated. A package 1000, formed as a box-like structure, contains first and second stacks 1001, 1002 of pads 1003, 1004. It will be appreciated that it is also advantageous for the top or first sheet of each pad 1003, 1004 to be tensioned and taut in supporting the weight of several stacked pads from the lowermost pads in a stack. It is preferred that the first stack 1001 is formed by pads according to the invention 1003 comprising a soluble beverage preparation product, such as milk powder/creamer, and the second stack is formed by pads 1004 according to co-pending patent application entitled "Coffee pad with a relatively large outlet opening for use in a coffee machine". Both pads 1003, 1004 having a similar top foil as the first flexible sheet ensures that the height of both stacks are and remain the same during storage.

Figure 24:
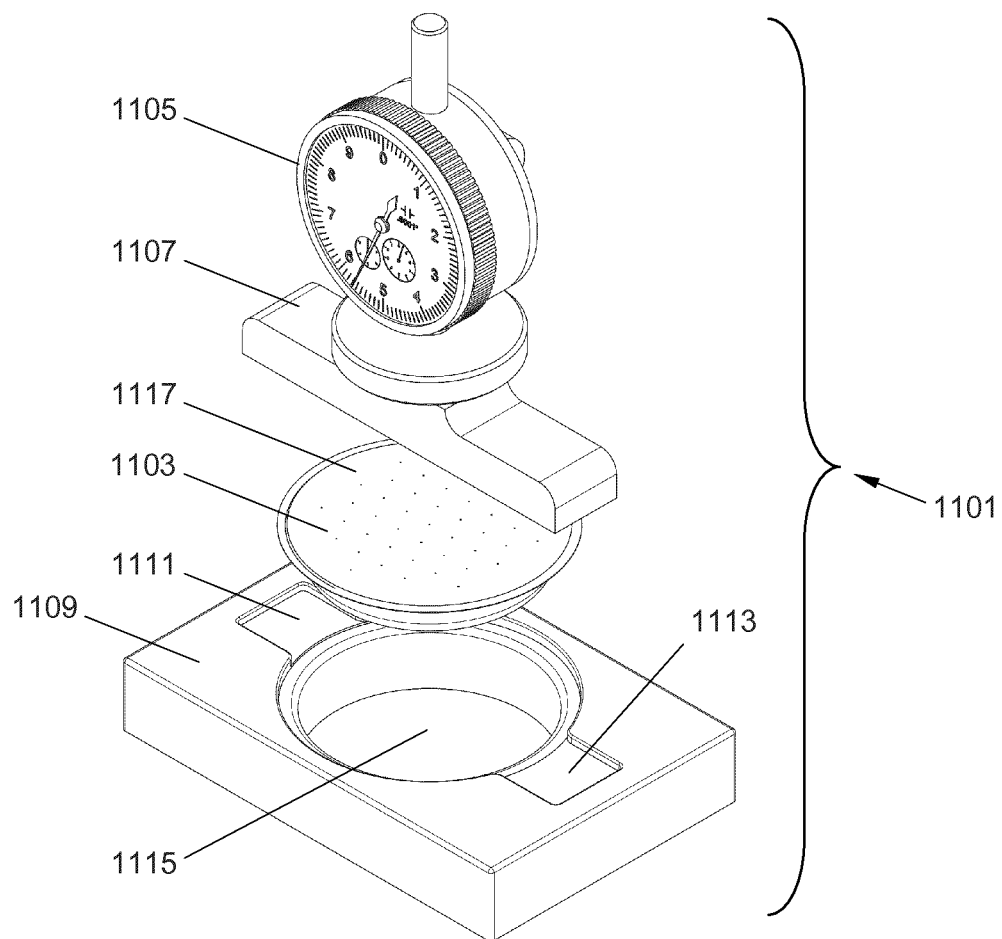
FIG. 24 is an exploded arrangement of a foil tester and pad for determining the tension of the top sheet of the pad.
Figure 25:
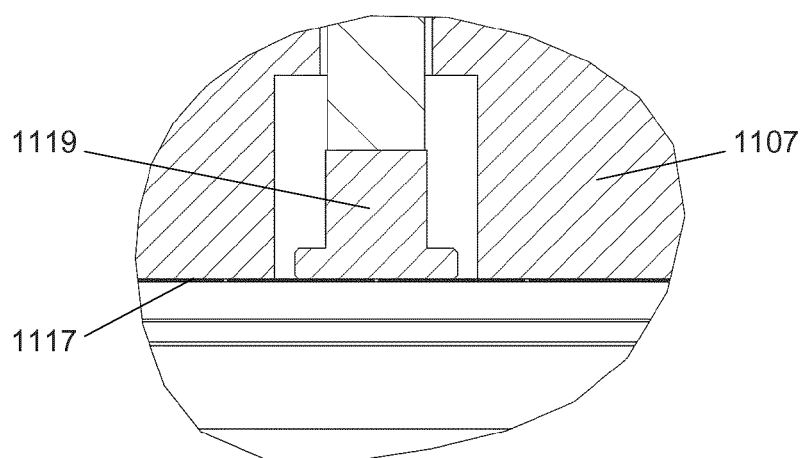
FIG. 25 is a cross sectional detail of a test probe resting on the top foil of a pad.

As explained above there are several reasons for the top sheet of the pad to have a predetermined tension. In FIG. 24 a foil tester 1101 for determining the tension of the top sheet of a pad 1103 is shown in an exploded arrangement. A conventional dial indicator 1105, such as one that is supplied by Mitutoyo (item 2358-60) is mounted to a support 1107, which is receivable in a predetermined position on a measuring base 1109. The measuring base 1109 is provided with an aligned pair of first recesses 1111, 1113 for accurately receiving the support 1107, and a second recess 1115 for accommodating the pad 1103. The pad 1103 is received in the second recess 1115 with its rigid shell, while its top sheet 1117 remains exposed. As is best seen in the cross sectional detail of FIG. 25 a test probe 1119 is resting on the top sheet or foil 1117 of the pad. This represents the situation that the support 1107 with the dial indicator 1105 has been lowered onto the measuring base 1109. The test probe 1119 has a flat contact surface and bears against the top sheet 1117 with a predetermined force of about 100 grams. The deflection allowed by the top sheet 1117 of the pad 1103 will then be displayed on the dial indicator 1105, and will provide a measure of the tension in the top sheet 1117.

Accordingly there is described a pad for use in a coffee machine for preparing at least one part of a single beverage serving which pad, for use in the coffee machine, is adapted to receive an aqueous fluid that is supplied under pressure so that the aqueous fluid is forced through the pad for obtaining the at least on part of the beverage serving that then exits the pad. The pad includes a covering defining an interior space that is filled with a beverage preparation product for preparing the beverage wherein the beverage preparation product includes a product soluble in an aqueous fluid. The covering comprises a flexible first sheet and a rigid shell, wherein the first sheet and the shell are connected to each other around their perimeter edges, and wherein the shell is equipped with at least one outlet opening. The pad is further equipped with a second sheet that is positioned on a bottom of the shell, wherein the second sheet is located between the beverage preparation product and the shell and wherein the first sheet and the second sheet each form a filter that allows an aqueous fluid, including water, and the beverage to pass and that forms a barrier for the beverage preparation product. When in use an aqueous fluid under pressure is supplied to the first sheet of the pad the aqueous fluid flows through the first sheet to the beverage preparation product so that the beverage is formed. The beverage then flows through the second sheet and via the at least one outlet opening leaves the pad. The at least one outlet opening has a diameter of at least 0.83 mm and defines the outlet flow of the beverage, when used in a coffee machine with e.g. a time controlled supply of aqueous fluid.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

What is claimed is:

1. A system comprising:
   a coffee machine for preparing a beverage, the coffee machine comprising:
   a holder comprising at least one beverage exit opening and being arranged for accommodating a first pad comprising two sheets of filtering paper connected to each other at circumferential edges thereof and enclosing an interior space containing roast and ground coffee;
   a lid for closing the holder; and
   wherein the coffee machine is constructed to generate an aqueous fluid flow under pressure into the holder;
   a second pad, different from the first pad, for use in the coffee machine for preparing a beverage for obtaining at least one part of a single beverage serving, which said second pad, for use in the coffee machine, is adapted to receive said aqueous fluid that is supplied under pressure so that the aqueous fluid is forced through the second pad for obtaining the beverage that exits the second pad, wherein the second pad includes a covering defining an interior space that is filled with a beverage preparation product for preparing the beverage, wherein the beverage preparation product includes a product soluble in an aqueous fluid, wherein the covering comprises a flexible first sheet and a rigid shell, wherein the flexible first sheet and the rigid shell are connected to each other around their perimeter edges, wherein the rigid shell is equipped with at least one outlet opening, wherein the second pad is further equipped with a second sheet that is positioned on a bottom of the rigid shell, wherein the second sheet is located between the beverage preparation product and the rigid shell, and wherein the flexible first sheet and the second sheet each form a filter that allows an aqueous fluid, including water, and the beverage to pass and that forms a barrier for the beverage preparation product so that, when in use an aqueous fluid under pressure is supplied to the flexible first sheet of the second pad, the aqueous fluid flows through the flexible first sheet to the beverage preparation product so that the beverage is formed, which beverage then flows through the second sheet and via the at least one outlet opening leaves the second pad, and wherein the second pad in use is accommodated in the holder;
   wherein the lid features at least one fluid inlet opening for feeding the aqueous fluid flow under pressure to the second pad so the aqueous fluid is fed under pressure to the flexible first sheet of the second pad and the aqueous fluid is forced through the second pad for preparation of the beverage in the second pad, wherein the beverage leaves the second pad via the at least one outlet opening of the second pad, and then exits the holder through the at least one beverage exit opening;
   wherein a restriction formed by the at least one outlet opening is less than a restriction formed by the beverage preparation product itself;
   wherein the second pad is arranged such that, in use when the second pad is positioned in the holder, a seal is formed between the second pad and the holder to reduce or prevent a flow of the aqueous fluid from a top side of the second pad around the second pad to the at least one beverage exit opening of the holder, said seal being a static seal, which provides a sealing engagement between the second pad and the holder under the sole influence of gravity on the second pad, and a dynamic seal, which provides a sealing engagement between the second pad and the holder under the influence of the pressure of the aqueous fluid on top of the second pad, wherein the static seal is formed by a contact between a perimeter flange of the second pad, which extends outwardly and downwardly from the second pad and an outer edge of the holder and wherein the dynamic seal is formed between an outer portion of the second pad and the holder at locations positioned at a smaller distance to a center of the second pad than the location of the static seal.

2. The system according to claim 1, wherein one side of the rigid shell forms an outside of the second pad.

3. The system according to claim 1, wherein in the interior space of the second pad in the bottom of the rigid shell a fluid collecting structure is provided that is in fluid communication with the at least one outlet opening.

4. The system according to claim 3, wherein the fluid collecting structure in the bottom of the rigid shell is provided with channels, which said channels are in fluid communication with the at least one outlet opening, and wherein the second sheet, which is positioned on the bottom of the rigid shell, covers the channels, so that a formed beverage flows through the second sheet where the channels are located and reaches the at least one outlet opening via the channels.

5. The system according to claim 4, wherein the channels are integrally formed in the bottom of the rigid shell.

6. The system according to claim 1, wherein the rigid shell at its underside is equipped with at least one substantially circular rib that is closed in itself.

7. The system according to claim 1, wherein the at least one beverage exit opening comprises a nozzle for generating a jet of fluid which, in use, impacts on a jet impact surface of the coffee machine for generating the beverage with a fine bubbled foam layer, wherein the second pad further includes a member constructed to establish, in use, a laminar flow of the beverage adjacent and towards the at least one beverage exit opening of the holder.

8. The system according to claim 7, wherein the member for establishing a laminar flow is arranged to provide, in use, a shortest flow path for the beverage, which extends between the at least one outlet opening of the second pad and the at least one exit opening of the holder and which is longer than a shortest flow path for the beverage, which would extend between the at least one outlet opening of the second pad and the at least one exit opening of the holder without the member for establishing a laminar flow.

9. The system according to claim 7, wherein the member for establishing a laminar flow includes at least one of a deflector for deflecting the flow of the beverage from the at least one outlet opening of the second pad and a labyrinth for diverting the flow of the beverage from the at least one outlet opening of the second pad.

10. The system according to claim 1, wherein the second pad comprises only one outlet opening.

11. The system according to claim 10, wherein the one outlet opening is positioned centrically in the bottom of the rigid shell.

12. The system according to claim 1, wherein, in use, for the dynamic seal, the fluid pressure is used to improve contact between the rigid shell and the holder.

13. The system according to claim 1, wherein the holder is equipped with a bowl-shaped interior space bounded by a bottom of the holder and an upstanding side wall of the holder wherein the bottom of the holder is equipped with a first bottom part that is adjacent to the side wall of the holder and a dish-shaped second bottom part of the holder that is adjacent to an inner edge of the first bottom part, wherein the dish-shaped second bottom part of the holder adjacent the first bottom part of the holder in a direction away from the side wall of the holder and directed inwardly of the holder slopes downwardly wherein the dish-shaped second bottom part of the holder is provided with grooves that form a fluid path to the at least one beverage exit opening.

14. The system according to claim 13, wherein the second pad rests on the bottom of the holder wherein the rigid shell coextends with the bottom to adjacent an upstanding wall of the holder.

15. The system according to claim 13, wherein an outer side of the rigid shell has a shape that corresponds with the shape of an inner side of the holder.

16. The system according to claim 1, wherein the at least one beverage exit opening of the holder is equipped with a nozzle for generating a jet of the beverage.

17. The system according to claim 16, wherein the holder further includes an impact surface which is so arranged that, in use, the jet impacts on the impact surface for beating air into the beverage to obtain a beverage with a fine-bubbled foam layer.

18. The system according to claim 1, wherein in a given length of time during use, with the aqueous fluid supplied at a given pressure, 110-130 ml beverage is obtained with the flexible first pad, while with the second pad, when using the same holder, and with the aqueous fluid supplied at the same given pressure during the same given length of time more than 95 ml is obtained.

19. The system according to claim 1, wherein the rigid shell at its outer face is equipped with at least one substantially circular rib, and wherein the substantially circular at least one rib of the second pad extends into a recess in the bottom of the holder for centering the second pad in the holder.

20. The system according to claim 1, wherein the static fluid seal is formed by a contact at a location between an outwardly directed perimeter flange of the second pad, which extends outwardly and downwardly, and a confronting outer edge of the holder.

* * * * *